United States Patent
Cheng et al.

(10) Patent No.: US 11,423,690 B2
(45) Date of Patent: Aug. 23, 2022

(54) FINGERPRINT IDENTIFICATION APPARATUS AND ELECTRONIC DEVICE

(71) Applicant: SHENZHEN GOODIX TECHNOLOGY CO., LTD., Shenzhen (CN)

(72) Inventors: Xiang Cheng, Shenzhen (CN); Jianxiang Zhang, Shenzhen (CN); Wei Zhang, Shenzhen (CN); Shunzhan Li, Shenzhen (CN)

(73) Assignee: SHENZHEN GOODIX TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/009,368

(22) Filed: Sep. 1, 2020

(65) Prior Publication Data
US 2020/0401782 A1 Dec. 24, 2020

Related U.S. Application Data

(63) Continuation of application No. PCT/CN2019/115443, filed on Nov. 4, 2019.

(30) Foreign Application Priority Data

Dec. 13, 2018 (WO) ................ PCT/CN2018/120893

(51) Int. Cl.
*G06K 9/00* (2022.01)
*G06V 40/12* (2022.01)
(Continued)

(52) U.S. Cl.
CPC ......... *G06V 40/1388* (2022.01); *G02B 5/201* (2013.01); *G06K 9/6256* (2013.01);
(Continued)

(58) Field of Classification Search
CPC ............. G06K 9/00114; G06K 9/0004; G06K 8/00087; G06K 9/0012; G06K 9/00906; G06K 9/6256; G06K 9/6262; G02B 5/201
See application file for complete search history.

(56) References Cited

U.S. PATENT DOCUMENTS

| 7,012,643 | B2 | 3/2006 | Frame |
| 7,834,988 | B2 | 11/2010 | Bahuguna |
(Continued)

FOREIGN PATENT DOCUMENTS

| CN | 101083274 A | 12/2007 |
| CN | 101529445 A | 9/2009 |
(Continued)

OTHER PUBLICATIONS

Gil Abramovich et al: "A spoof detection method for contactless fingerprint collection utilizing spectrum and polarization diversity". Proceedings of SPIE, vol. 7680, Apr. 21, 2010 (Apr. 21, 2010), p. 768005, XP055102409,ISSN: 0277-786X. DOI: 10.1117/12.851375, 11 pages.
(Continued)

*Primary Examiner* — Lixi C Simpson
(74) *Attorney, Agent, or Firm* — Scully Scott Murphy & Presser

(57) ABSTRACT

Provided is a fingerprint identification apparatus which includes: a micro lens array; at least one light shielding layer; a pixel unit array; and an array of filter unit groups, where each filter unit group includes at least two filter units which transmit light signals in at least two colors respectively, where the pixel unit array includes a pixel unit group corresponding to the filter unit group, at least two pixel units in the pixel unit group receive a first light signal through the at least two filter units respectively, and a pixel unit except the at least two pixel units receives a second light signal through a transparent region between the at least two filter
(Continued)

units, or a pixel unit between pixel unit groups receives the second light signal through a transparent region between the filter unit groups. The apparatus can improve the security of identification without affecting identification effect.

20 Claims, 10 Drawing Sheets

(51) Int. Cl.
*G02B 5/20* (2006.01)
*G06K 9/62* (2022.01)
*G06V 40/40* (2022.01)
*G06V 40/13* (2022.01)
*G06V 10/82* (2022.01)

(52) U.S. Cl.
CPC .......... *G06K 9/6262* (2013.01); *G06V 10/82* (2022.01); *G06V 40/1318* (2022.01); *G06V 40/1365* (2022.01); *G06V 40/1394* (2022.01); *G06V 40/45* (2022.01)

(56) References Cited

U.S. PATENT DOCUMENTS

| | | | |
|---|---|---|---|
| 8,284,019 | B2 | 10/2012 | Pishva |
| 8,339,486 | B2 | 12/2012 | Nakashiba |
| 8,340,362 | B2 | 12/2012 | Arai et al. |
| 8,768,015 | B2 | 7/2014 | Higuchi |
| 8,787,630 | B2 | 7/2014 | Rowe |
| 9,165,178 | B2 | 10/2015 | Higuchi |
| 9,934,421 | B1 | 4/2018 | Nilsson |
| 10,031,602 | B2 | 7/2018 | Kitchens, II et al. |
| 2003/0210332 | A1 | 11/2003 | Frame |
| 2006/0023314 | A1 | 2/2006 | Boettiger et al. |
| 2007/0285541 | A1 | 12/2007 | Nakashiba |
| 2009/0046903 | A1 | 2/2009 | Corcoran et al. |
| 2009/0116030 | A1 | 5/2009 | Bahuguna |
| 2011/0165911 | A1 | 7/2011 | Rowe |
| 2011/0273599 | A1 | 11/2011 | Murata |
| 2012/0070043 | A1 | 3/2012 | Higuchi |
| 2013/0076911 | A1 | 3/2013 | Nakashiba |
| 2014/0254895 | A1 | 9/2014 | Higuchi |
| 2014/0354597 | A1 | 12/2014 | Kitchens, II et al. |
| 2014/0354608 | A1 | 12/2014 | Kitchens, II et al. |
| 2014/0354823 | A1 | 12/2014 | Kitchens et al. |
| 2014/0354905 | A1 | 12/2014 | Kitchens et al. |
| 2016/0092717 | A1 | 3/2016 | Ling |
| 2016/0254312 | A1 | 9/2016 | Lee et al. |
| 2017/0199610 | A1 | 7/2017 | Kitchens, II et al. |
| 2017/0213019 | A1 | 7/2017 | Mao |
| 2017/0237957 | A1 | 8/2017 | Cho et al. |
| 2017/0371213 | A1 | 12/2017 | Wang et al. |
| 2018/0046848 | A1 | 2/2018 | Zhou |
| 2018/0089491 | A1 | 3/2018 | Kim et al. |
| 2018/0165496 | A1 | 6/2018 | Cheng et al. |
| 2018/0204040 | A1 | 7/2018 | Kwon et al. |
| 2018/0225498 | A1 | 8/2018 | Setlak |
| 2018/0260602 | A1 | 9/2018 | He et al. |
| 2019/0019000 | A1* | 1/2019 | Lee .................. H01L 27/14678 |
| 2019/0026523 | A1 | 1/2019 | Shen et al. |
| 2019/0049631 | A1 | 2/2019 | Lin et al. |
| 2019/0157337 | A1 | 5/2019 | Lin et al. |
| 2019/0179488 | A1 | 6/2019 | Klenkler et al. |
| 2019/0180071 | A1* | 6/2019 | Kim .................... G06K 9/0004 |
| 2019/0279580 | A1 | 9/2019 | Noh et al. |
| 2019/0303639 | A1* | 10/2019 | He ....................... G06K 9/0012 |
| 2019/0311176 | A1 | 10/2019 | Haddad et al. |
| 2019/0347464 | A1 | 11/2019 | Shen et al. |
| 2020/0074136 | A1 | 3/2020 | Shi |
| 2020/0133414 | A1 | 4/2020 | Lee et al. |
| 2020/0266227 | A1 | 8/2020 | Wang et al. |
| 2021/0271003 | A1 | 9/2021 | Yang et al. |
| 2021/0409581 | A1 | 12/2021 | Hai et al. |

FOREIGN PATENT DOCUMENTS

| | | |
|---|---|---|
| CN | 102103685 A | 6/2011 |
| CN | 101083274 B | 12/2011 |
| CN | 102693414 A | 9/2012 |
| CN | 101069190 B | 10/2012 |
| CN | 102804229 A | 11/2012 |
| CN | 103116744 A | 5/2013 |
| CN | 103260045 A | 8/2013 |
| CN | 103544474 A | 1/2014 |
| CN | 103679152 A | 3/2014 |
| CN | 105303179 A | 2/2016 |
| CN | 105469106 A | 4/2016 |
| CN | 106228147 A | 12/2016 |
| CN | 107122742 A | 9/2017 |
| CN | 107480579 A | 12/2017 |
| CN | 107679486 A | 2/2018 |
| CN | 105980853 B | 7/2018 |
| CN | 108596124 A | 9/2018 |
| CN | 108881750 A | 11/2018 |
| CN | 109255285 A | 1/2019 |
| CN | 109313706 A | 2/2019 |
| CN | 109389023 A | 2/2019 |
| CN | 109643379 A | 4/2019 |
| CN | 109863506 A | 6/2019 |
| CN | 109983471 A | 7/2019 |
| CN | 110062931 A | 7/2019 |
| CN | 209168144 U | 7/2019 |
| CN | 110088768 A | 8/2019 |
| CN | 210091193 U | 2/2020 |
| CN | 210864757 U | 6/2020 |
| CN | 211529173 U | 9/2020 |
| JP | S61153779 A | 7/1986 |
| JP | 1930109 B2 | 5/2012 |
| KR | 1020150131944 A | 11/2015 |
| WO | 2008111994 A1 | 9/2008 |
| WO | 2018183206 A1 | 10/2018 |

OTHER PUBLICATIONS

Kang, I. et al., "Fingerprint pixel sensor array on a display", APCCAS, 2016, pp. 557-558.
Cai, X. et al., "Study on High-pass Filtering Properties in Real-time Optical Correlation System for Fingerprint Verification", Journal of Nanjing Institute of Posts and Telecommunications, Mar. 31, 1997, pp. 123-126, vol. 17, No. 1 together with an English language abstract.
Jiao, X. et al., "Optical acquiring technique of three-dimensional integral imaging based on optimal pick-up distance", Optics and Precision Engineering, 2011, pp. 2807-2811, vol. 19, No. 11.
Kitamura, Y. et al., "Suppression of crosstalk by using backside deep trench isolation for 1.12μm backside Illuminated CMOS image sensor", 2012 International Electron Devices Meeting, 2013, pp. 24.2.1-24.2.4.
Gonzalez, R et al., "Digital Image Processing, Third Edition", Beijing: Publishing House of Electronics Industry, Jun. 1, 2011, pp. 26-27 together with an English language abstract.

* cited by examiner

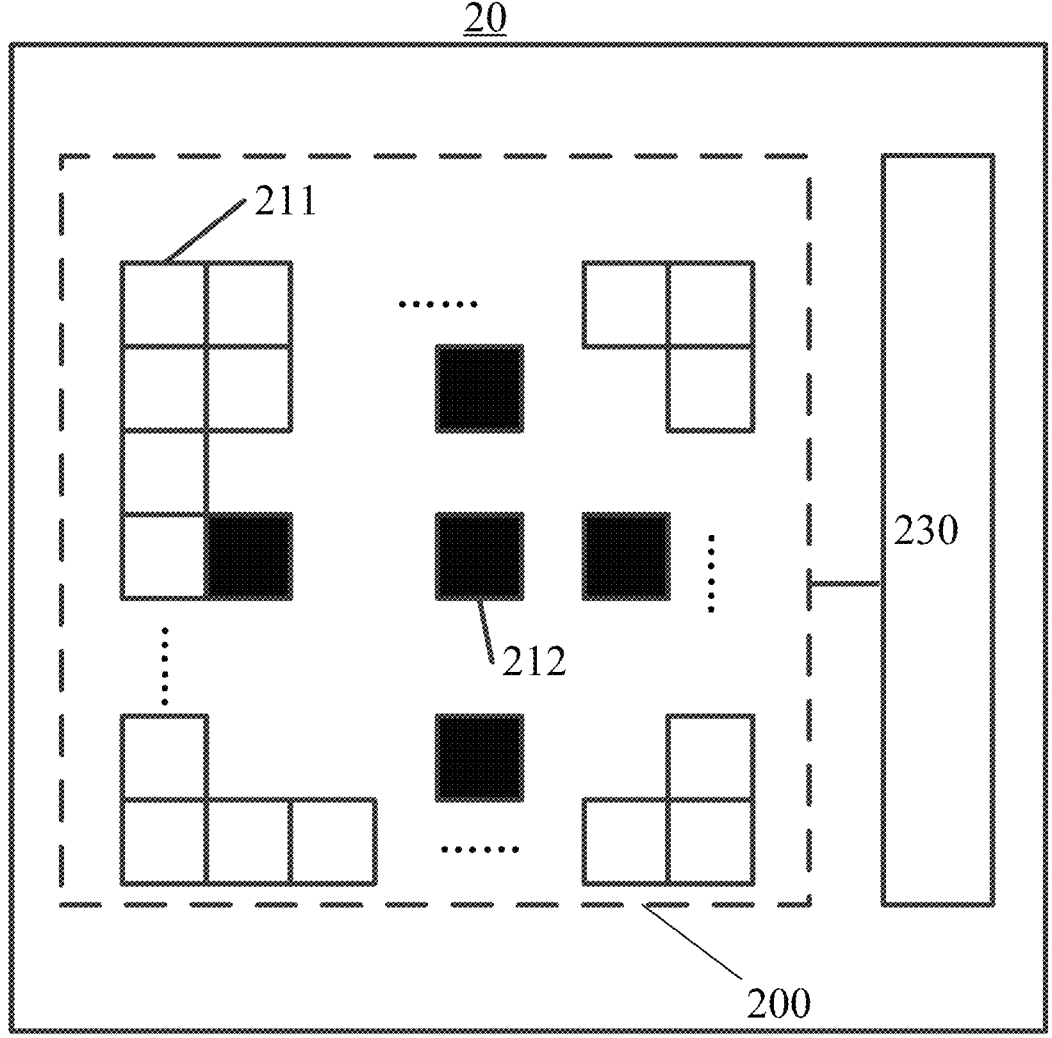
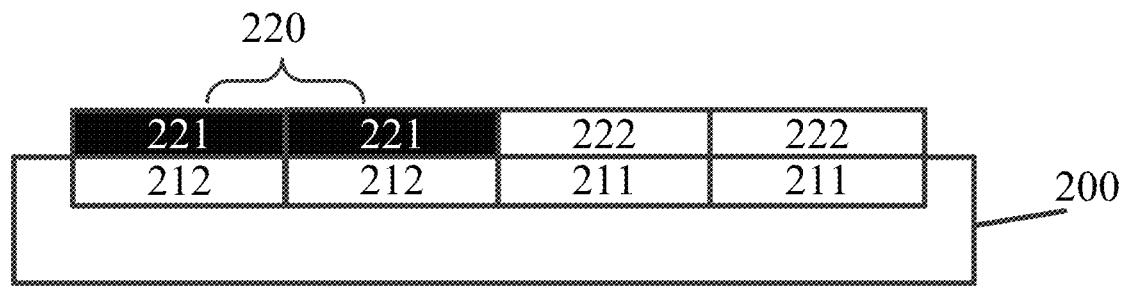
FIG. 3

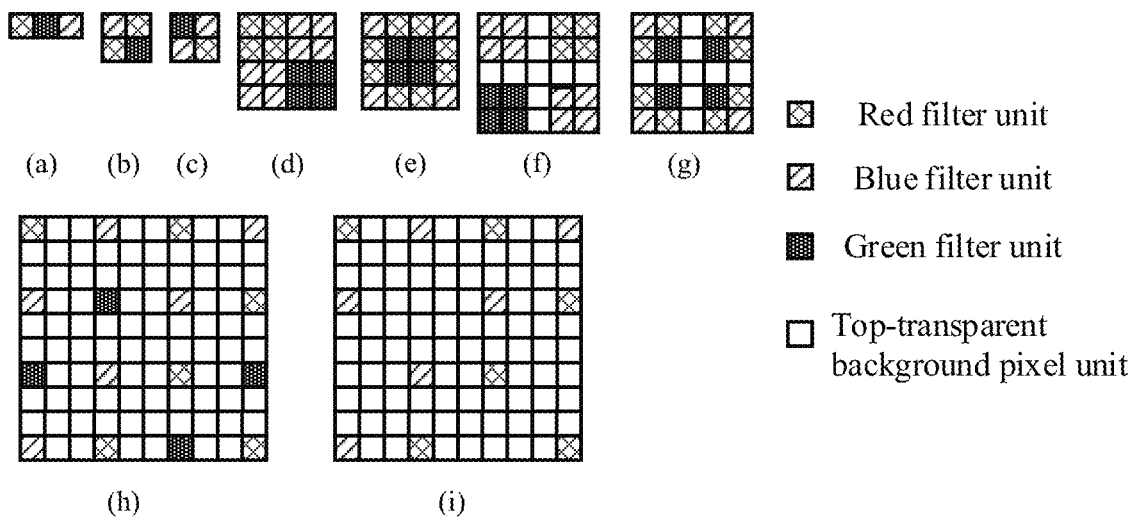

- ⊠ Red filter unit
- ⊘ Blue filter unit
- ■ Green filter unit
- ☐ Top-transparent background pixel unit

FIG. 6

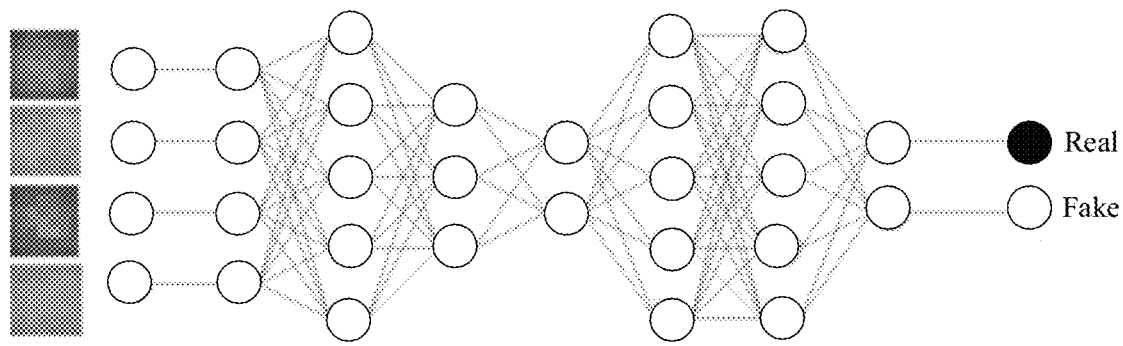

- ● Real
- ○ Fake

| Capturing a fingerprint image of an object to be identified through a plurality of pixel units of an optical fingerprint sensor, where at least two filter units are disposed above at least two of the plurality of pixel units, each filter unit corresponds to one pixel unit, and the at least two filter units include filter units in at least two colors | S401 |

⊠ Red filter unit

◨ Blue filter unit

■ Green filter unit

⊠ Red filter unit

◨ Blue filter unit

▫ Pixel unit whose pixel value is attenuated

FINGERPRINT IDENTIFICATION APPARATUS AND ELECTRONIC DEVICE

CROSS-REFERENCE TO RELATED APPLICATIONS

This application is a continuation of International Application No. PCT/CN2019/115443, filed on Nov. 4, 2019, which claims priority to International Application No. PCT/CN2018/120893, filed on Dec. 13, 2018. The disclosures of the aforementioned applications are hereby incorporated by reference in their entireties.

TECHNICAL FIELD

The present application relates to the field of optical fingerprint technologies, and in particular, to a fingerprint identification apparatus and an electronic device.

BACKGROUND

The application of an optical fingerprint identification apparatus brings safe and convenient user experience to a user, however, a forged fingerprint such as a fingerprint mold made of an artificial material (for example, silica gel, white glue, or the like) and a printed fingerprint image is a potential safety hazard in fingerprint application. Therefore, how to identify authenticity of a fingerprint to improve security of fingerprint identification is an urgent problem to be solved.

SUMMARY

Provided are a fingerprint identification apparatus and an electronic device, which could identify authenticity of a fingerprint, thereby improving security of fingerprint identification.

In a first aspect, provided is a fingerprint identification apparatus, where the fingerprint identification apparatus is applied under a display screen to implement under-screen optical fingerprint identification, and the fingerprint identification apparatus includes:

a micro lens array disposed below the display screen;

at least one light shielding layer disposed below the micro lens array, where each light shielding layer in the at least one light shielding layer is provided with an array of small holes;

a pixel unit array disposed below an array of small holes of a bottom light shielding layer in the at least one light shielding layer, so that a light signal returned from a finger above the display screen is transmitted to the pixel unit array through the array of small holes provided in the at least one light shielding layer after being converged by the micro lens array; and an array of filter unit groups, where each filter unit group in the array of filter unit groups includes at least two filter units, and the at least two filter units are configured to transmit light signals in at least two colors respectively, where the pixel unit array includes a pixel unit group corresponding to the filter unit group, at least two pixel units in the pixel unit group receive a first light signal through the at least two filter units respectively, the first light signal is used to detect whether the finger is a real finger, and a pixel unit except the at least two pixel units in the pixel unit group receives a second light signal through a transparent region between the at least two filter units, or a pixel unit between pixel unit groups receives the second light signal through a transparent region between the filter unit groups, and the second light signal is used to identify fingerprint information of the finger.

Through a fingerprint image captured by the at least two pixel units, it can be determined whether the finger above the display screen is a real finger, and through a pixel unit except the at least two pixel units, a fingerprint image for fingerprint identification can be acquired. That is, the fingerprint identification apparatus captures a fingerprint image once, which can be used not only for authenticity identification, but also for fingerprint identification, thereby improving the security of fingerprint identification without affecting the fingerprint identification effect. For example, the fingerprint image captured by the at least two pixel units is a fingerprint image in two colors. Since fingerprint images in different colors have significant differences for different materials, authenticity of the fingerprint image can be determined by comparing the fingerprint images in different colors, and thus security of fingerprint identification could be improved.

In some possible implementation manners, each filter unit in the filter unit group corresponds to a plurality of adjacent pixel units in the pixel unit group.

In some possible implementation manners, the pixel unit group is a rectangular array of 20×20 pixel units, and the filter unit group is a rectangular array of 4×4 filter units, each filter unit in the rectangular array of 4×4 filter units corresponds to a rectangular array of 2×2 pixel units in the rectangular array of 20×20 pixel units, and two adjacent filter units in the rectangular array of 4×4 filter units are spaced by 4 pixel units.

In some possible implementation manners, the first light signal received by the plurality of adjacent pixel units is used to synthesize a pixel value.

Using the first light signal received by the plurality of adjacent pixel units to synthesize a pixel value can not only improve the brightness of fingerprint image in different colors, but also simplify the preparation complexity of the array of filter unit groups.

In some possible implementation manners, each filter unit in the filter unit group corresponds to one pixel unit in the pixel unit group.

That each filter unit corresponds to one pixel unit in the pixel unit group can not only improve the resolution of fingerprint image in different colors, but also ensure that the at least two pixel units are evenly distributed in the pixel unit group.

In some possible implementation manners, the pixel unit group is a rectangular array of 20×20 pixel units, the filter unit group is a rectangular array of 4×4 filter units, and two adjacent filter units in the rectangular array of 4×4 filter units are spaced by 5 pixel units.

In some possible implementation manners, the pixel unit group is a rectangular array of 2×2 pixel units, and the filter unit group is a rectangular array of 2×2 filter units.

In some possible implementation manners, a ratio of pixel units corresponding to the array of filter unit groups to all pixel units in the pixel unit array is greater than or equal to a first preset value, and the ratio of pixel units corresponding to the array of filter unit groups to all pixel units in the pixel unit array is less than or equal to a second preset value.

Through the first preset value, it can be ensured that the fingerprint image for real and fake fingerprint identification has sufficient feature information, and through the second preset value, it can be ensured that the fingerprint image for fingerprint information identification has sufficient feature information. In other words, by setting the first preset value and the second preset value, it is possible to ensure that the accuracy or correctness of real and fake fingerprint judgment is improved on the basis of not affecting the effect of fingerprint identification.

In some possible implementation manners, the first preset value is 1%, and/or the second preset value is 2%.

In some possible implementation manners, a number of pixel units spaced by two adjacent filter unit groups in the array of filter unit groups is greater than or equal to a third preset value, and the number of pixel units spaced by two adjacent filter unit groups in the array of filter unit groups is less than or equal to a fourth preset value.

At least two pixel units in the pixel unit group are configured for real and fake fingerprint identification. In the fingerprint identification process, the pixel values of the positions of the at least two pixel units can be recovered by interpolation. By considering the influence of the filter unit group, pixel values of the pixel units between the pixel unit groups (for example, the pixel units adjacent to the pixel unit group in the upper, lower, left, and right sides) may be attenuated to some extent. Through the third preset value, it can be ensured that the pixel units between the pixel unit groups not only have attenuated pixel units, but also have non-attenuated pixel units. Through the fourth preset value, correlation between the two adjacent pixel unit groups can be ensured, so that whether the finger located above the display screen is a real finger can be determined by the pixel values in at least two colors for the same position of the finger.

In some possible implementation manners, the third preset value is 2, and/or the fourth preset value is 6.

In some possible implementation manners, the array of filter unit groups is a rectangular array of 9×6 filter unit groups, or the array of filter unit groups is a rectangular array of 6×6 filter unit groups, or the array of filter unit groups is a rectangular array of 7×7 filter unit groups, or the array of filter unit groups is a rectangular array of 6×4 filter unit groups.

In some possible implementation manners, the array of filter unit groups is disposed above the micro lens array, or the array of filter unit groups is disposed between the micro lens array and the pixel unit array.

In some possible implementation manners, the fingerprint identification apparatus further includes:

an infrared filter layer, where the infrared filter layer is disposed above the micro lens array, or the infrared filter layer is disposed between the micro lens array and the pixel unit array, and the infrared filter layer is configured to filter out an infrared light signal.

In some possible implementation manners, a number of filter units for transmitting a red light signal in the at least two filter units is greater than a number of filter units for transmitting a light signal in another color in the at least two filter units.

The number of filter units for transmitting the red light signal is designed to be greater than the number of filter units for transmitting the light signal in another color, which can ensure that a red fingerprint image for distinguishing between real and fake fingerprints has sufficient brightness even if an infrared filter layer is provided between the array of filter unit groups and the pixel unit array of the fingerprint identification apparatus, thereby improving the identification effect of the red fingerprint image.

In some possible implementation manners, the at least one light shielding layer is a plurality of light shielding layers, and a hole in an array of small holes of a top light shielding layer in the plurality of light shielding layers corresponds to one or more pixel units in the pixel unit array.

In some possible implementation manners, apertures of holes in the plurality of light shielding layers corresponding to the same pixel unit decrease in order from top to bottom.

In some possible implementation manners, a metal wiring layer of the pixel unit array is disposed at a position of a back focal plane of the micro lens array, and the metal wiring layer is provided with a hole formed above each pixel unit in the pixel unit array to form the bottom light shielding layer.

In some possible implementation manners, the fingerprint identification apparatus further includes:

a transparent medium layer, where the transparent medium layer is configured to connect the micro lens array, the at least one light shielding layer and the pixel unit array.

In a second aspect, provided is an electronic device, including:

a display screen; and a fingerprint identification apparatus in the first aspect or any possible implementation manner of the first aspect, where the apparatus is disposed under the display screen to implement under-screen optical fingerprint detection.

BRIEF DESCRIPTION OF THE DRAWINGS

FIG. 3 is a schematic structural diagram of a fingerprint identification apparatus according to an embodiment of the present application.

FIG. 6 is a schematic diagram of another design manner of filter units in a filter unit group.

FIG. 7 is a structural diagram of a convolutional neural network according to an embodiment of the present application.

FIG. 8 is a schematic flowchart of a fingerprint identification method according to an embodiment of the present application.

DESCRIPTION OF EMBODIMENTS

Technical solutions in embodiments of the present application will be described hereinafter with reference to accompanying drawings.

It should be understood that embodiments of the present application may be applied to an optical fingerprint system, including but not limited to an optical fingerprint identification system and a medical diagnostic product based on optical fingerprint imaging. The embodiments of the present application are only described by taking the optical fingerprint system as an example, which should not constitute any limitation to the embodiments of the present application, and the embodiments of the present application are also applicable to other systems using an optical imaging technology or the like.

As a common application scenario, the optical fingerprint system provided in an embodiment of the present application may be applied to a smart phone, a tablet computer, and other mobile terminals having a display screen or other terminal devices. More specifically, in the foregoing terminal device, a fingerprint identification apparatus may be specifically an optical fingerprint apparatus, which may be disposed in a partial region or an entire region under a display screen, thereby forming an under-display optical fingerprint system. Alternatively, the fingerprint identification apparatus may be partially or entirely integrated into the interior of the display screen of the terminal device to form an in-display optical fingerprint system.

Figure 1:
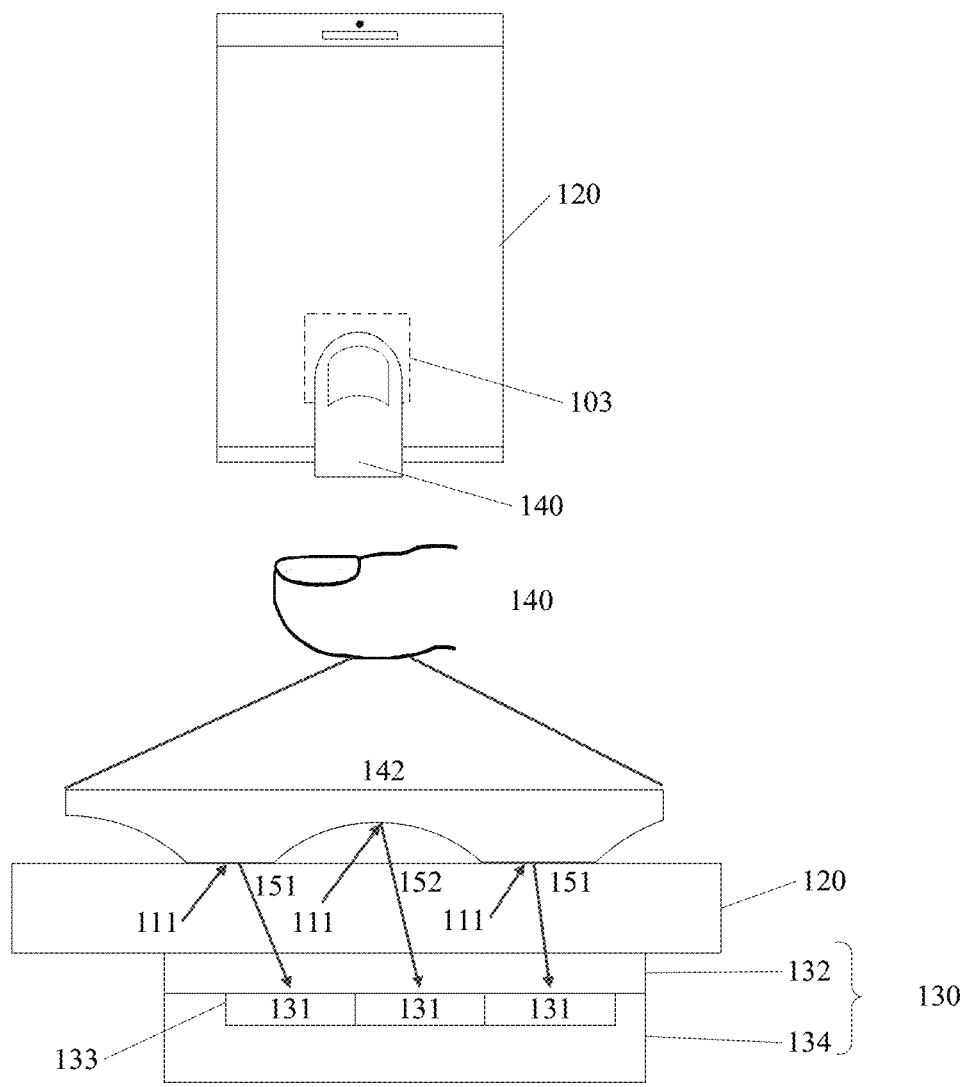
FIG. 1 is a schematic structural diagram of an electronic device to which an embodiment of the present application is applicable.

FIG. 1 is a schematic structural diagram of a terminal device to which an embodiment of the present application can be applicable. A terminal device 10 includes a display screen 120 and an optical fingerprint apparatus 130, where the optical fingerprint apparatus 130 is disposed in a partial region under the display screen 120. The optical fingerprint apparatus 130 includes an optical fingerprint sensor including a sensing array 133 having a plurality of optical sensing units 131, and a region where the sensing array 133 is located or a sensing region of the sensing array 133 is a fingerprint detecting region 103 of the optical fingerprint apparatus 130. As shown in FIG. 1, the fingerprint detecting region 103 is located within a display region of the display screen 120. In an alternative embodiment, the optical fingerprint apparatus 130 may also be disposed at other positions, such as a side of the display screen 120 or an edge non-light transmissive region of the terminal device 10, and a light signal of at least part of the display region of the display screen 120 is directed to the optical fingerprint apparatus 130 through a light path design, such that the fingerprint detecting region 103 is actually located in the display region of the display screen 120.

It should be understood that an area of the fingerprint detecting region 103 may be different from an area of the sensing array of the optical fingerprint apparatus 130. For example, the area of the fingerprint detecting region 103 of the optical fingerprint apparatus 130 may be larger than the area of the sensing array of the optical fingerprint apparatus 130 through a lens imaging light path design, a reflective folding light path design or other light path designs such as light convergence or reflection for example. In other alternative implementation manners, if the light path is directed in a manner of light collimation for example, the area of the fingerprint detecting region 103 of the optical fingerprint apparatus 130 may also be designed to be substantially identical with the area of the sensing array of the optical fingerprint apparatus 130.

Therefore, when a user needs to unlock the terminal device or perform other fingerprint verification, a fingerprint input may be implemented merely by pressing a finger on the fingerprint detecting region 103 located on the display screen 120. Since fingerprint detection may be implemented in the screen, there is no need to exclusively reserve space for a front surface of the terminal device 10 adopting the foregoing structure to set a fingerprint button (such as a Home button), so that a full screen solution may be adopted; that is, the display region of the display screen 120 may be substantially extended to an entire front surface of the terminal device 10.

As an optional implementation manner, as shown in FIG. 1, the optical fingerprint apparatus 130 includes a light detecting portion 134 and an optical component 132. The light detecting portion 134 includes the sensing array, and a readout circuit and other auxiliary circuits electrically connected to the sensing array, which is fabricated in a die by a semiconductor process such as an optical imaging chip or an optical fingerprint sensor; the sensing array is specifically a photo detector array including a plurality of photo detectors distributed in an array, and the photo detectors may be used as the optical sensing unit as described above. The optical component 132 may be disposed above the sensing array of the light detecting portion 134, and may specifically include a filter layer, a light directing layer or a light path directing structure, and other optical elements, the filter layer may be used to filter ambient light passing through a finger, and the light directing layer or light path directing structure is mainly used to direct reflected light reflected from a finger surface to the sensing array for optical detection.

In a specific implementation, the optical component 132 and the light detecting portion 134 may be encapsulated in the same optical fingerprint member. For example, the optical component 132 and the light detecting portion 134 may be encapsulated in the same optical fingerprint chip, or the optical component 132 may be disposed outside a chip where the light detecting portion 134 is located, for example, the optical component 132 is attached above the chip, or a part of elements of the optical component 132 are integrated into the chip.

There are various implementations for the light directing layer or light path directing structure of the optical component 132, for example, the light directing layer may be specifically a collimator layer fabricated on a semiconductor silicon wafer, which has a plurality of collimating units or micro-pore arrays, and the collimating unit may be a hole. Light in the reflected light reflected from the finger that is vertically incident to the collimating unit may pass through the collimating unit and be received by the optical sensing unit below it. However, light with an excessive large incident angle is attenuated through multiple reflection inside the collimating unit, therefore, each optical sensing unit may basically only receive the reflected light reflected from a fingerprint pattern right above the optical sensing unit, and thus the sensing array may detect a fingerprint image of the finger.

In another embodiment, the light directing layer or the light path directing structure may also be an optical lens layer having one or more lens units, for example, a lens group composed of one or more aspheric lenses, for converging reflected light reflected from the finger to the sensing array of the light detecting portion 134 below it, so that the sensing array may perform imaging based on the reflected light so as to obtain the fingerprint image of the finger. Optionally, the optical lens layer may be provided with a pinhole in the light path of the lens unit, and the pinhole may cooperate with the optical lens layer to expand the field of view of the optical fingerprint apparatus, to improve a fingerprint imaging effect of the optical fingerprint apparatus 130.

In other embodiments, the light directing layer or the light path directing structure may also specifically adopt a micro-lens layer having a micro-lens array constituted by a plurality of micro-lenses, which may be formed above the sensing array of the light detecting portion 134 by a semiconductor growth process or other processes, and each micro-lens may correspond to one of the sensing units in the sensing array respectively. Furthermore, other optical film layers, such as a dielectric layer or a passivation layer, may be formed between the micro-lens layer and the sensing unit, and more specifically, a light shielding layer having a micro-pore may also be formed between the micro-lens layer and the sensing unit, where the micro-pore is formed between the corresponding micro-lens and the sensing unit, and the light shielding layer may shield optical interference between adjacent micro-lens and sensing unit, such that light corresponding to the sensing unit is converged to the interior of the micro-pore through the micro-lens and transmitted to the sensing unit via the micro-pore for optical fingerprint imaging. It should be understood that several implementations of the forgoing light path directing structure may be used alone or in combination, for example, a micro-lens layer may be further disposed under the collimator layer or the optical lens layer. Of course, when the collimator layer or the optical lens layer is used in combination with the micro-lens layer, the specific laminated structure or light path may require to be adjusted according to actual needs.

As an optional embodiment, the display screen 120 may adopt a display screen with a self-emitting display unit, for example, an organic light-emitting diode (OLED) display screen or a micro light-emitting diode (Micro-LED) display screen. By taking an OLED display screen as an example, the optical fingerprint apparatus 130 may use a display unit (that is, an OLED light source) of the OLED display screen 120 that is located in the fingerprint detecting region 103 as an excitation light source for optical fingerprint detection. When a finger 140 is pressed against the fingerprint detecting region 103, the display screen 120 emits a beam of light 111 to a target finger 140 above the fingerprint detecting region 103, and the light 111 is reflected by a surface of the finger 140 to form reflected light or form scattered light after scattering inside the finger 140. In related patent applications, the reflected light and the scattered light are collectively referred to as reflected light for convenience of description. Since a ridge and a valley of a fingerprint have different light reflecting capabilities, reflected light 151 from the ridge of the fingerprint and the reflected light 152 from the valley of the fingerprint have different light intensities. After passing through the optical component 132, the reflected light is received by the sensing array 134 in the optical fingerprint apparatus 130 and converted into corresponding electrical signal, that is, a fingerprint detecting signal; and fingerprint image data may be obtained based on the fingerprint detecting signal, and fingerprint matching verification may be further performed, thereby implementing an optical fingerprint identification function at the terminal device 10.

In other embodiments, the optical fingerprint apparatus 130 may also use an internal light source or an external light source to provide a light signal for fingerprint detection. In this case, the optical fingerprint apparatus 130 may be applied to a non-self-emitting display screen, such as a liquid crystal display screen or other passive light-emitting display screens. By taking a liquid crystal display screen having a backlight module and a liquid crystal panel as an example, in order to support under-screen fingerprint detection of the liquid crystal display screen, the optical fingerprint system of the terminal device 10 may further include an excitation light source for optical fingerprint detection. The excitation light source may specifically be an infrared light source or a light source of non-visible light with a specific wavelength, which may be disposed under the backlight module of the liquid crystal display screen or disposed in an edge region under a protective cover of the terminal device 10. The optical fingerprint apparatus 130 may be disposed under the liquid crystal panel or the edge region of the protective cover, and light for fingerprint detection may reach the optical fingerprint apparatus 130 by being directed over a light path. Alternatively, the optical fingerprint apparatus 130 may also be disposed under the backlight module, and the backlight module allows the light for fingerprint detection to pass through the liquid crystal panel and the backlight module and reach the optical fingerprint apparatus 130 by providing a via hole on film layers such as a diffusion sheet, a brightening sheet, a reflection sheet or the like, or by performing other optical designs. When the optical fingerprint apparatus 130 uses an internal light source or an external light source to provide a light signal for fingerprint detection, a detection principle is consistent with the foregoing description.

It should be understood that, in a specific implementation, the terminal device 10 further includes a transparent protective cover; the cover may be a glass cover or a sapphire cover, which is located above the display screen 120 and covers a front surface of the terminal device 10. Therefore, in an embodiment of the present application, the so-called the finger being pressed against the display screen 120 actually refers to the finger being pressed against the cover 110 above the display screen 120 or a surface of the protective layer covering the cover 110.

On the other hand, in some embodiments, the optical fingerprint apparatus 130 may only include one optical fingerprint sensor, and in this case, the fingerprint detecting region 103 of the optical fingerprint apparatus 130 has a smaller area and a fixed position, and therefore, when an fingerprint input is performed, the user needs to press the finger at a specific position of the fingerprint detecting region 103, otherwise the optical fingerprint apparatus 130 may not be able to capture the fingerprint image, thereby resulting in poor user experience. In other alternative embodiments, the optical fingerprint apparatus 130 may specifically include a plurality of optical fingerprint sensors which may be disposed under the display screen 120 side by side in a splicing manner, and sensing regions of the plurality of optical fingerprint sensors collectively constitute the fingerprint detecting region 103 of the optical fingerprint apparatus 130. In other words, the fingerprint detecting region 103 of the optical fingerprint apparatus 130 may include a plurality of sub-regions, each sub-region corresponding to a sensing region of one of the optical fingerprint sensors respectively, so that a fingerprint capturing region 103 of the optical fingerprint module 130 may be extended to a main region of a lower portion of the display screen, that is, it is extended to a generally pressed region by the finger, thereby achieving a blind pressing type of a fingerprint input operation. Alternatively, when the number of the optical fingerprint sensors is sufficient, the fingerprint detecting region 130 may also be extended to a half of the display region or even the entire display region, thereby achieving half-screen or full-screen fingerprint detection.

It should also be understood that in the embodiment of the present application, the sensing array in the optical fingerprint apparatus may also be referred to as a pixel array, and the optical sensing unit or sensing unit in the sensing array may also be referred to as a pixel unit.

It should be noted that the optical fingerprint apparatus in the embodiment of the present application may also be referred to as an optical fingerprint identification module, a fingerprint identification apparatus, a fingerprint identification module, a fingerprint module, a fingerprint capturing apparatus, or the like, and the foregoing terms may be replaced with each other.

Generally speaking, influenced by factors of skin layer thickness, hemoglobin concentration, melanin content and the like of a human skin tissue, reflection performance of the human skin tissue to a specific wavelength of light such as red light is significantly different from that of an artificial material such as silica gel, paper and adhesive tape.

Figure 2:
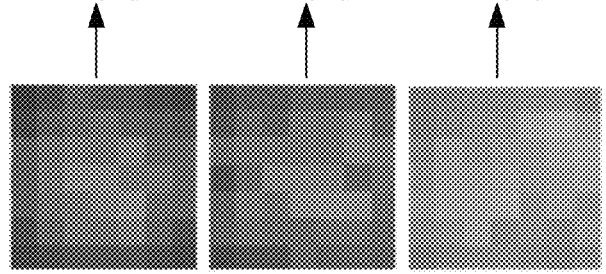
FIG. 2 is a difference comparison diagram of color fingerprint images corresponding to real and fake fingerprints.

Based on this, the present application provides a fingerprint identification solution, where filter units in at least two colors are disposed above a part of pixel units (denoted as characteristic pixel units) in a fingerprint identification apparatus, so that a fingerprint image captured by the characteristic pixel units is a low-resolution color fingerprint image. For different materials (for example, a human finger and an artificial material such as silica gel), the low-resolution color fingerprint image has significantly different characteristics, as shown in FIG. 2. Therefore, authenticity of a fingerprint image may be determined according to the differences of the low-resolution color fingerprint image captured by the characteristic pixel units.

Hereinafter, the fingerprint identification apparatus according to an embodiment of the present application will be described in detail with reference to FIGS. 3 to 10.

It should be noted that in embodiments illustrated below, the same structure is denoted by the same reference numeral for ease of understanding, and detailed description of the same structure is omitted for brevity.

It should be understood that the number and arrangement manners of pixel units, filter units, and filter unit groups in embodiments of the present application shown below are merely illustrative and should not constitute any limitation to the present application.

FIG. 3 is a schematic structural diagram of a fingerprint identification apparatus 20 provided in an embodiment of the present application. The fingerprint identification apparatus 20 includes:

an optical fingerprint sensor 200 including a plurality of pixel units, for example, a pixel unit 211 and a pixel unit 212 in FIG. 3; and at least two filter units 221 disposed above at least two pixel units 212 of the plurality of pixel units, where each filter unit 221 corresponds to one pixel unit 212, and the at least two filter units 221 include filter units in at least two colors.

Optionally, in the embodiment of the present application, the fingerprint identification apparatus may be a fingerprint module, or the fingerprint identification apparatus may be an electronic device including a fingerprint module, which is not limited in the embodiment of the present application.

It should be understood that in the embodiment of the present application, the at least two filter units 212 may constitute at least one filter unit group 220, and a design manner of the filter units in each filter unit group and an arrangement manner of the at least one filter unit group in the optical fingerprint sensor will be described in detail below.

For convenience of distinction and illustration, in the embodiment of the present application, a pixel unit provided with the filter unit 221 above, that is, the pixel unit 212 in FIG. 3, is denoted as a characteristic pixel unit; and other pixel units except the at least two pixel units, that is, the pixel unit 211 in FIG. 3, are denoted as an ordinary pixel unit, or a background pixel unit. It should be understood that positions, number and distribution situations of the characteristic pixel units 212 and the background pixel units 211 in FIG. 3 are only examples, but should not constitute any limitation to the embodiments of the present application.

In the embodiment of the present application, when the fingerprint image is captured, the fingerprint detecting region of the display screen may display a light spot in a particular color such as a white light spot or a cyan light spot, and when an object to be identified is pressed against the fingerprint detecting region, the light signal corresponding to the light spot may be reflected by the surface of the object to be identified to form a fingerprint detecting signal. Since at least two filter units 221 are disposed above at least two characteristic pixel units 212 and include filter units in at least two colors, after the fingerprint detecting signal passes through the filter units 221 in at least two colors, the at least two characteristic pixel units 212 can capture a color fingerprint image having at least two colors. Moreover, after the fingerprint detecting signal passes through the filter units 221, a part of a wave band of the light signal is filtered, and a resolution of the fingerprint image is reduced compared with a fingerprint image captured by the pixel unit that is not provided with the filter unit. Therefore, the fingerprint image captured by the characteristic pixel unit is a low-resolution color fingerprint image. Further, authenticity of a fingerprint may be determined according to the low-resolution color fingerprint image.

It should be understood that in the embodiment of the present application, it only needs to capture a fingerprint image once and thus obtain a color fingerprint image having different colors through filter units in different colors without having to capture the fingerprint image multiple times, which is beneficial for reducing capture time and improving capture efficiency.

Optionally, in the embodiment of the present application, a filter unit generally allows only a light signal within a particular wave band range to pass. Therefore, for a single filter unit, a wave band range of emitted light of a light source for fingerprint detection needs to include the wave band of the filter unit and at least part of other wave bands expect the wave band, that is, a wave band of a single filter unit only includes a part of wave bands of the emitted light. In this way, after the emitted light is reflected by the surface of the object to be identified, the emitted light enters the filter unit, and after passing through the filter unit, a part of the light signals is filtered while a part of the light signals is allowed to pass through, thereby further realizing imaging on the characteristic pixel unit, and thus obtaining a low-resolution color fingerprint image.

For example, if the light source emits white light, that is, a white light spot is displayed in the fingerprint detecting region, the filter unit may be a red filter unit that allows only a red light wave band to pass, or may be a blue filter unit that allows only a blue light wave band to pass, or may be a cyan filter unit that allows both green light and blue light wave bands to pass, and the like, as long as the filter unit may filter light signals of a part of wave bands while allowing light signals of other wave bands to pass through, which is not limited in the embodiment of the present application.

As an optional embodiment, if the filter unit 221 is a red filter unit, the red filter unit may be a red filter material or a red filter plate, that is, a red filter material may be coated above the characteristic pixel unit or a red filter plate may be disposed above the characteristic pixel unit to achieve a purpose of allowing only a red light wave band to pass, and implementation manners for filter units in other colors are similar and will not be repeatedly described herein.

For example, a wave band range of a blue filter plate may be 440 nm to 475 nm in a center wave band and about 550 nm in an upper cut-off wave band, and transmittance of blue light is higher than that of green light and red light; a wave band range of a green filter plate may be 520 nm to 550 nm in a center wave band, and about 620 nm and 460 nm in upper and lower cut-off wave bands, and transmittance of green light is higher than that of blue light and red light; and a wave band range of a red filter plate may be about 550 nm in a lower cut-off wave band, and transmittance of red light is higher than that of green light and blue light.

Optionally, in an embodiment of the present application, the light source for the fingerprint detection may be a self-emitting light source from the display screen, or may be an excitation light source integrated inside the fingerprint identification apparatus or other external excitation light sources, which is not limited in the embodiment of the present application.

In an optional implementation manner, no other structures may be disposed above the background pixel unit 211, or no material is coated; that is, the background pixel unit 211 is transparent above and no processing is performed on the background pixel unit 211. In other words, there is an air gap between the background pixel unit and the optical component above the background pixel unit.

In another optional implementation manner, a light transmissive material 222 may be disposed above the background pixel unit 211, and in this case, the fingerprint detecting signal entering the background pixel unit 211 is also unaffected or slightly affected.

In other optional implementation manners, the filter layer 222 such as a green filter layer may also be disposed above the background pixel unit 211. Optionally, a green filter material may be coated above the background pixel unit 211, or a green filter plate may be disposed above the background pixel unit 211. In this case, after the fingerprint detecting signal passes through the green filter layer, a fingerprint image captured by the background pixel unit 211 is a green fingerprint image, that is, a fingerprint detecting signal whose red wave band and blue wave band have been filtered, which is beneficial for reducing an influence of an ambient light signal such as infrared light and the like, and thus fingerprint identification performance can be improved.

Hereinafter, a design manner of positions and colors of the at least two filter units in the optical fingerprint sensor 200 will be described with reference to a specific embodiment.

It should be understood that in an embodiment of the present application, the at least two filter units may be consecutive filter units, or may be consecutive for some filter units, or may be discrete filter units, which is not limited in the embodiment of the present application.

Optionally, in the embodiment of the present application, the number of consecutive filter units may be set to be less than or equal to a particular threshold, for example, 6, and correspondingly, the number of consecutive characteristic pixel units is also not greater than the particular threshold, which can avoid the influence on fingerprint identification performance.

Optionally, in some embodiments, the at least two filter units 221 may constitute a plurality of filter unit groups 220, and each filter unit group 220 may include filter units in at least two colors. As an optional embodiment, the plurality of filter unit groups 220 may be discretely distributed at a photosensitive region of the optical fingerprint sensor. Accordingly, it may be considered that the characteristic pixel unit groups corresponding to the filter unit groups are discretely distributed in a pixel array of the optical fingerprint sensor, and thus the influence on fingerprint identification performance can be avoided due to excessive number of pixel units consecutively covered by the filter unit group. It should be understood that a photosensitive region of the optical fingerprint sensor may be understood as a region where the pixel unit of the optical fingerprint sensor is located, or may be referred to as a pixel region.

Figure 4:
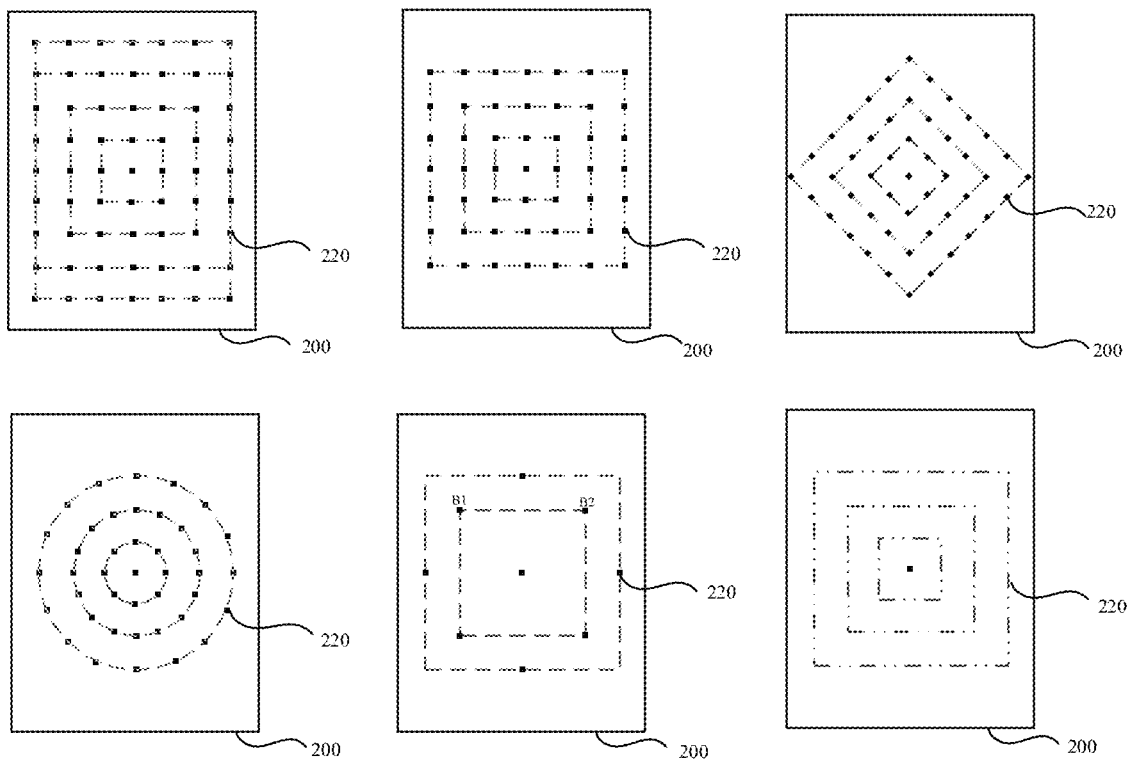
FIG. 4 is a schematic diagram of arrangement manners of filter unit groups according to an embodiment of the present application.

With reference to FIG. 4, several possible implementation manners of filter unit groups 220 in the optical fingerprint sensor will be illustrated.

In one implementation manner, filter unit groups 220 may be disposed in an equally spaced checkerboard arrangement manner, for example, a rectangular or square checkerboard pattern as shown in FIG. 4. In this case, the filter unit groups are a filter array M×N, where the M and N may be determined according to the number of rows and columns of the pixel array of the optical fingerprint sensor. Optionally, the M may be 5, 6, 7, . . . , 32, etc., and the N may be 5, 6, 7, . . . , 32, etc., which is not limited by the embodiment of the present application.

In other optional implementation manners, the filter unit groups 220 may also be arranged in a rhombus, a circle or other regular or irregular patterns in the photosensitive region of the optical fingerprint sensor, which is not limited in the embodiment of the present application.

It should be understood that FIG. 4 shows several typical arrangement manners of the filter unit groups 221, or preferred arrangement manners, but it should not constitute any limitation to the embodiment of the present application. The embodiment of the present application may also adopt other arrangement manners to set the filter unit groups, as long as it does not affect the fingerprint identification performance or has little influence on the fingerprint identification performance.

Hereinafter, a design manner of filter units in a filter unit group will be described by taking a single filter unit group as an example.

Optionally, in some embodiments, adjacent filter units in the filter unit group at least include a red filter unit and a blue filter unit, and optionally, in some cases, may also include a green filter unit. It should be understood that the adjacent filter units herein may be physically adjacent, or may be spaced apart by one or more background pixel units, which is not limited by the embodiment of the present application.

As can be seen from the forgoing description, a filter layer may be disposed above a background pixel unit (denoted as a case 1) or transparent processing is performed above a background pixel unit (denoted as a case 2). Hereinafter, a design manner of filter units in a filter unit group will be described in combination with the two cases.

As for case 1, if a filter layer is disposed above a background pixel unit adjacent to a filter unit in a filter unit group, the filter unit group may not include a filter unit that has the same color as the filter layer. Assuming that a green filter layer is disposed above the background pixel unit, the adjacent filter units may only include filter units in red and blue colors, so as to avoid the influence on fingerprint identification performance. Of course, in this case, a green filter unit may also be included, as long as the number of green filter units does not affect the fingerprint identification performance or has little influence on the fingerprint identification performance.

As for case 2, the background pixel unit adjacent to the filter unit in the filter unit group is transparent above, and in this case, the filter unit adjacent to the background pixel unit may include any two or three of a red filter unit, a blue filter unit, and a green filter unit.

In general, compared to a red light wave band and a blue light wave band, fingerprint identification performance is better by using a fingerprint image of a green light wave band for fingerprint identification. Therefore, in the embodiment of the present application, when the background pixel unit adopts a fingerprint image of a green light wave band for fingerprint identification, a green filter unit shall be avoided at the time of setting the filter unit, which can reduce the influence on fingerprint identification performance.

Figure 5:
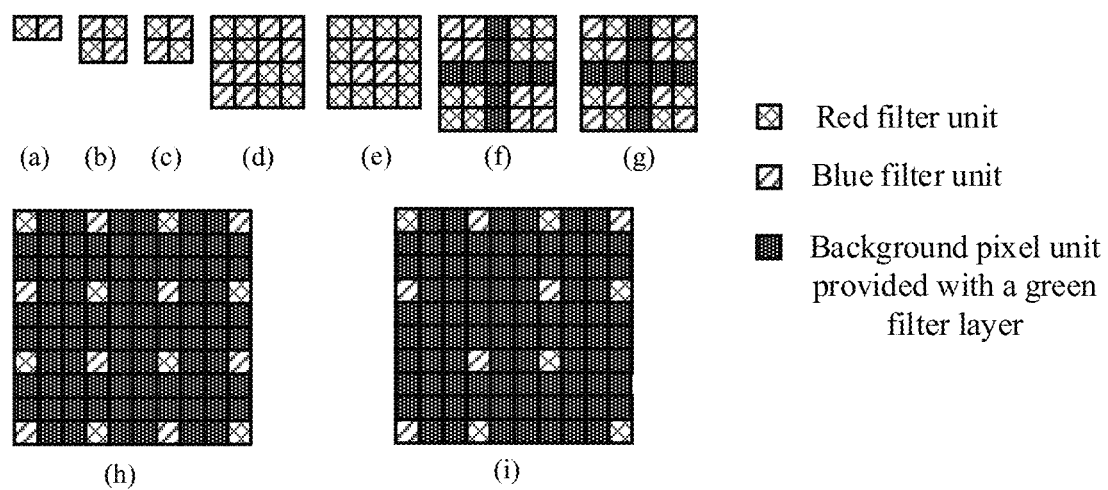
FIG. 5 is a schematic diagram of a design manner of filter units in a filter unit group.

FIGS. 5 and 6 show several design manners of filter units in a filter unit group in the foregoing two cases respectively.

Specifically, FIG. 5 shows several design manners of filter units in a filter unit group when a green filter layer is disposed above a background pixel unit. As shown in FIG. 5, the filter unit group may be a regular array such as 1×2, 2×2, and 4×4 or may be an irregular array. When a green filter layer is disposed above the background pixel unit, that is, a background color is green, the filter unit group may only have a filter unit in red and blue, and thus the influence on fingerprint identification performance can be avoided.

FIG. 6 shows possible design manners of filter units in a filter unit group when the background pixel unit is transparent above. As shown in FIG. 6, the filter unit group may also be a regular array such as 1×2, 2×2, and 4×4 or may be an irregular array. When the background pixel unit is transparent above, that is, when the background is transparent, the filter units in the filter unit group may include filter units in red, blue and green, and certainly may only include filter units in two colors of the foregoing three colors.

It should be understood that in the embodiment of the present application, filter units in a single filter unit group may be consecutive, such as design manners a to e in FIG. 5 or FIG. 6, or may be partially inconsecutive, such as design manners f to g in FIG. 5 or FIG. 6, that is, a part of filter units are spaced by background pixel units, or may be discrete, that is, the filter units are all spaced by background pixel units, such as design manners h to i in FIG. 5 or FIG. 6.

Optionally, in the embodiment of the present application, the fingerprint image captured by the background pixel units may be used for fingerprint matching verification. Due to existence of the characteristic pixel unit, the fingerprint image captured by the background pixel units is not a complete fingerprint image. Therefore, before fingerprint identification is performed, the complete fingerprint image may be recovered according to the fingerprint image captured by the background pixel units, for example, a fingerprint image at the position of the characteristic pixel unit may be recovered by interpolation or fitting to obtain the complete fingerprint image.

It can be understood that the more the number of non-background color pixel units is, the more missing information of the fingerprint image captured by the background pixel units is, which is not conducive to the recovery or restoration of the complete fingerprint image according to the fingerprint image captured by the background pixel units.

It can also be understood that when there is a larger number of consecutive pixel units in the non-background color pixel units, that is, when adjacent background color pixel units are spaced far apart, excessive fingerprint information is lost in the middle, which is not conducive to the recovery or restoration of the complete fingerprint image.

Therefore, in the embodiment of the present application, it may be set that the number of non-background color filter units satisfies at least one of the following conditions to reduce the influence on fingerprint identification performance:

1. the number of non-background color filter units is less than a particular threshold, for example, 20;

2. a ratio of the number of the non-background color filter units to the total number of pixel units in the optical fingerprint sensor is less than a first threshold, for example, 5% or 2%; and 3. the number of consecutive non-background color filter units is less than a second threshold.

Since a non-background color filter unit is in one-to-one correspondence with a non-background color pixel unit, it may be set that the number of non-background color pixel units satisfies at least one of the following conditions in the embodiment of the present application, so as to reduce the influence on fingerprint identification performance:

1. the number of non-background color pixel units is less than a particular number threshold, for example, 20;

2. a ratio of the number of the non-background color pixel units to the total number of pixel units in the optical fingerprint sensor is less than a first threshold, for example, 5% or 2%; and 3. the number of consecutive non-background color pixel units is less than a second threshold.

It should be understood that in the embodiment of the present application, a color of the non-background color filter unit is different from a color of a filter layer disposed above the background pixel unit, for example, the non-background color filter unit is a red filter unit, or the background pixel unit is transparent above.

Correspondingly, a color of the filter unit disposed above the non-background color pixel unit is different from a color of the filter layer disposed above the background pixel unit, for example, a red filter unit is disposed above the non-background color pixel unit, a green filter layer is disposed above the background pixel unit, or no filter layer is disposed above the background pixel unit.

It should be understood that in the embodiment of the present application, the second threshold may be the number of consecutive pixel units in the horizontal direction, for example, 6, or may be the number of consecutive pixel units in the vertical direction, for example, 6, or may be the number of consecutive pixel units in the horizontal direction and the number of consecutive pixel units in the vertical direction, that is, an area of consecutive pixel units, for example, 6×6, which is not limited in the embodiment of the present application.

It should be noted that in the embodiment of the present application, colors and positions of the filter units in each of the plurality of filter unit groups may be set in the same way, or colors and/or positions of one or more filter units in a certain or several filter unit groups may be changed, that is, colors and/or positions of the filter units in the filter unit group may be partially adjusted, so long as the fingerprint identification performance is not affected, which is not limited by the embodiment of the present application.

Optionally, in the embodiment of the present application, the fingerprint identification apparatus 20 may further include:

a processor 230 configured to determine, according to the fingerprint image captured by the at least two pixel units, whether the fingerprint image is from a real finger.

Specifically, the plurality of pixel units of the optical fingerprint sensor may perform imaging on the fingerprint detecting signal reflected from the surface of an object to be identified. Further, the processor may extract and recombine the fingerprint image captured by the characteristic pixel units of the plurality of pixel units to obtain a low-resolution color fingerprint image, and then the processor 230 may input the low-resolution color fingerprint image to a deep learning network that has been successfully trained, and process the color fingerprint image through the deep learning network to determine whether the color fingerprint image is from a real finger.

Optionally, in the embodiment of the present application, the processor 230 may be a processor in a fingerprint module such as a micro control unit (MCU), or may also be a processor in an electronic device such as a host module, which is not limited in the embodiment of the present application.

Optionally, in the embodiment of the present application, the deep learning network may be a convolutional neural network or other deep learning networks, which is not limited by the embodiment of the present application. Hereinafter, a specific training process is illustrated by taking a convolutional neural network as an example.

First, a convolutional neural network structure is constructed, for example, a two-layer convolutional neural network as shown in FIG. 7, or a three-layer network structure or more layers of network structures may be adopted, and constitution of each layer of convolution network structure may also be adjusted according to fingerprint information to be extracted, which is not limited in the embodiment of the present application.

Second, an initial training parameter and a convergence condition of the convolutional neural network are set.

Optionally, in the embodiment of the present application, the initial training parameter may be randomly generated, or acquired according to empirical values, or may be a parameter of a convolutional neural network model pre-trained according to a large amount of real and fake fingerprint data, which is not limited in the embodiment of the present application.

Optionally, in an embodiment of the present application, the convergence condition may include at least one of the following:

1. a probability of determining a color fingerprint image of a real finger to be a fingerprint image of a real finger is greater than a first probability, for example, 98%;

2. a probability of determining a color fingerprint image of a fake finger to be a fingerprint image of a fake finger is greater than a second probability, for example 95%;

3. a probability of determining a color fingerprint image of a real finger as a fingerprint image of a fake finger is less than a third probability, for example, 2%; and 4. a probability of determining a color fingerprint image of a fake finger to be a fingerprint image of a real finger is less than a fourth probability, for example, 3%.

Then, a large number of color fingerprint images of real fingers and fake fingers are input to the convolutional neural network, and the convolutional neural network may process the foregoing color fingerprint images based on an initial training parameter to determine a determination result for each color fingerprint image. Further, according to the determination result, the structure of convolutional neural network and/or the training parameter of each layer are adjusted until the determination result satisfies the convergence condition.

Hereinafter, other color fingerprint images captured by the characteristic pixel units may be input to the convolutional neural network, so that the convolutional neural network may process the color fingerprint images using trained parameters to determine whether the color fingerprint images are from a real finger.

Optionally, in the embodiment of the present application, the processor 230 may further determine whether the object to be identified is a real finger if a fingerprint image captured by the background pixel units matches a registered fingerprint template of the object to be identified, determine fingerprint authentication to be successful if the object to be identified is a real finger, and thus execute an operation of triggering the fingerprint identification, for example, an operation of terminal unlocking or payment.

Optionally, in the embodiment of the present application, the processor 230 may further determine whether a fingerprint image captured by the background pixel units matches a registered fingerprint template of the object to be identified if the object to be identified is a real finger, determine fingerprint authentication to be successful if matched, and further execute an operation of triggering the fingerprint identification, for example, an operation of terminal unlocking or payment.

Optionally, in the embodiment of the present application, the fingerprint identification apparatus 200 may further include an optical component that may correspond to the optical component 132 in FIG. 1, and details are not described herein again.

An apparatus embodiment of the present application is described in detail with reference to FIGS. 3 to 7, and a method embodiment of the present application is described in detail below with reference to FIG. 8. It should be understood that the method embodiment corresponds to the apparatus embodiment, and similar description may refer to the apparatus embodiment.

FIG. 8 is a schematic flowchart of a fingerprint identification method according to an embodiment of the present application. It should be understood that a method 400 may be applied to the fingerprint identification apparatus 20 shown in FIG. 3. As shown in FIG. 8, the method 400 includes:

S401, capturing a fingerprint image of an object to be identified through a plurality of pixel units of an optical fingerprint sensor, where at least two filter units are disposed above at least two of the plurality of pixel units, each filter unit corresponds to one pixel unit, and the at least two filter units include filter units in at least two colors.

Optionally, the method 400 may be executed by a processor in the fingerprint identification apparatus such as a micro control unit (MCU) in a fingerprint module, or may also be executed by a processor in an electronic device, such as a host module, which is not limited by the embodiments of the present application.

Optionally, in some embodiments, the method 400 may further include:

determining, according to a fingerprint image of an object to be identified captured by the at least two pixel units, whether the object to be identified is a real finger.

Optionally, in some embodiments, determining, according to the fingerprint image of the object to be identified captured by the at least two pixel units, whether the object to be identified is the real finger includes:

processing, through a deep learning network, the fingerprint image of the object to be identified captured by the at least two pixel units to determine whether the object to be identified is a real finger.

Optionally, in some embodiments, the method further includes:

capturing fingerprint images of a plurality of real fingers and fake fingers through the optical fingerprint sensor;

extracting sample values of the pixel units corresponding to the filter units in each fingerprint image, and recombining the sample values to obtain a color fingerprint image; and inputting the color fingerprint image into the deep learning network for training to obtain a model and a parameter of the deep learning network.

Optionally, in some embodiments, the method further includes:

performing fingerprint identification according to a fingerprint image captured by other pixel units except the at least two pixel units in the plurality of pixel units.

Optionally, in the embodiment of the present application, first, whether the object to be identified is a real finger may be determined, and then if the object to be identified is a real finger, whether fingerprint information of the object to be identified matches recorded fingerprint information of the object to be identified may be determined, and if the foregoing two conditions are satisfied at the same time, fingerprint authentication is determined to be successful, and an operation of triggering the fingerprint identification is further executed, for example, an operation of terminal unlocking or payment.

Alternatively, it is also possible to first determine whether the fingerprint information of the object to be identified matches the recorded fingerprint information of the object to be identified, and further determine whether the object to be identified is a real finger if fingerprint matching succeeds; and then if the object to be identified is a real finger, fingerprint authentication is determined to be successful and further an operation of triggering the fingerprint identification is executed, for example, an operation of terminal unlocking or payment.

Optionally, in some embodiments, the at least two filter units include a plurality of first filter units, where a color of the plurality of first filter units is different from a color of a filter layer disposed above other pixel units except the at least two pixel units in the plurality of pixel units, or no filter layer is disposed above the other pixel units.

Optionally, in some embodiments, a ratio of the number of the plurality of first filter units to a total number of the plurality of pixel units is less than a first threshold.

Optionally, in some embodiments, the first threshold is 5%.

Optionally, in some embodiments, the number of consecutive filter units in the plurality of first filter units is less than a second threshold.

Optionally, in some embodiments, the second threshold is 8.

Optionally, in some embodiments, the at least two filter units constitute at least one filter unit group, each filter unit group includes at least two filter units, and adjacent filter units in the filter unit group include filter units in at least two colors.

Optionally, in some embodiments, if a green filter layer is disposed above other pixel units except the at least two pixel units in the plurality of pixel units, the adjacent filter units in the filter unit group include a red filter unit and a blue filter unit exclusively; or if no filter layer is disposed above the other pixel units, the adjacent filter units in the filter unit group include at least two of a red filter unit, a green filter unit and a blue filter unit.

Optionally, in some embodiments, a wave band range of each of the at least two filter units includes a part of a wave band range of a light signal for fingerprint detection exclusively.

Optionally, in some embodiments, the at least two filter units constitute a plurality of filter unit groups, and the plurality of filter unit groups are discretely distributed in a pixel array constituted by the plurality of pixel units.

Optionally, in some embodiments, the plurality of filter unit groups are evenly distributed in a pixel array of the optical fingerprint sensor in a rectangle, square, rhombus or circle.

Optionally, in some embodiments, the filter unit is a color filter material, and the color filter material includes at least one of a red filter material, a green filter material, and a blue filter material.

Optionally, in some embodiments, the filter unit is a color filter plate, and the color filter plate is one of a red filter plate, a green filter plate and a blue filter plate.

Figure 9:
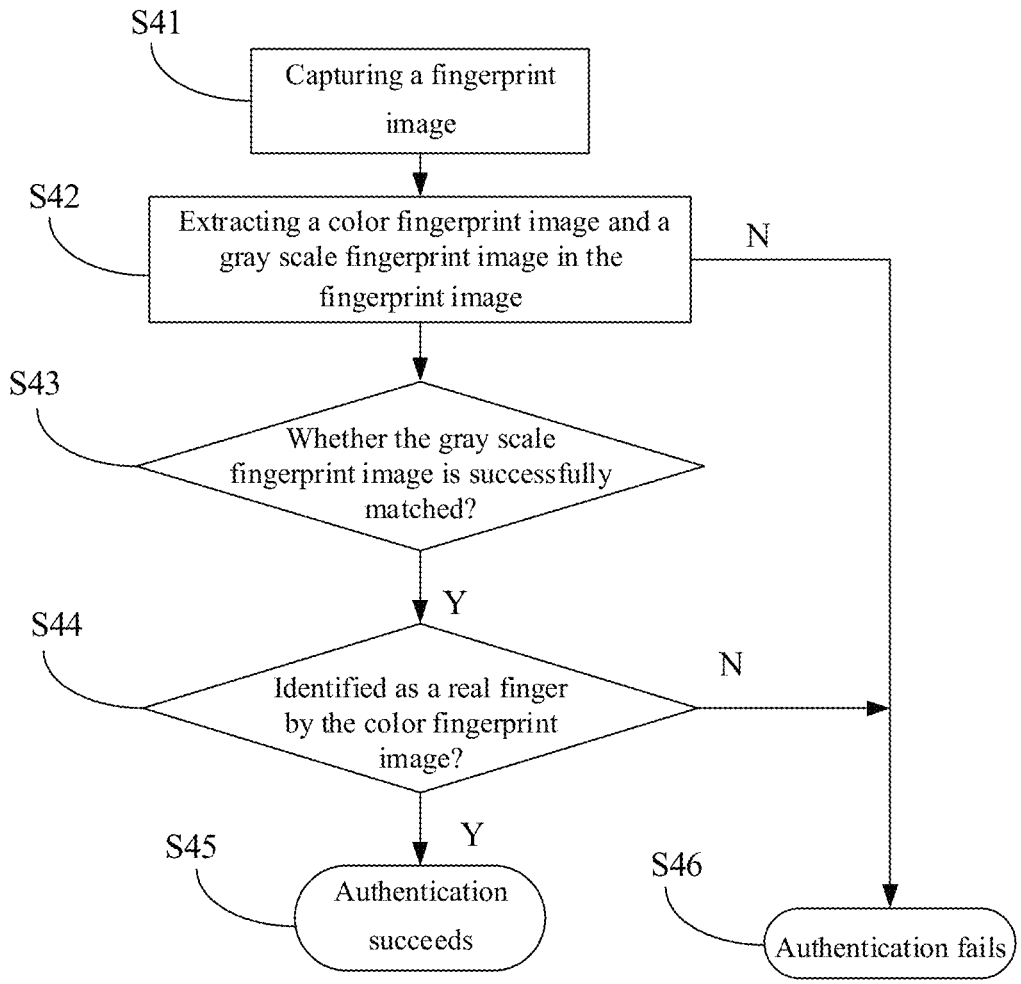
FIG. 9 is a schematic flowchart of a fingerprint identification method according to another embodiment of the present application.

Hereinafter, a fingerprint identification method according to an embodiment of the present application will be described with reference to the specific embodiment shown in FIG. 9. As shown in FIG. 9, the method may include the following contents:

S41, a fingerprint image is captured through an optical fingerprint sensor;

where the fingerprint image includes a fingerprint image captured by an ordinary pixel unit and a fingerprint image captured by a characteristic pixel unit.

Further, in S42, the fingerprint image captured by the ordinary pixel unit (denoted as a gray scale fingerprint image) and the fingerprint image captured by the characteristic pixel unit (that is, a color fingerprint image) in the fingerprint image are extracted and recombined.

Then, in S43, the gray scale fingerprint image is matched with a registered fingerprint template to determine whether the matching is successful.

If the matching is successful, S44 is executed; otherwise, S46 is executed to determine that authentication fails and refuse to execute an operation of triggering the fingerprint authentication, for example, an operation of screen unlocking or payment.

It should be understood that in S43, before performing fingerprint matching, processing such as interpolation or fitting may be first performed on fingerprint information missed at the position of the characteristic pixel unit in the gray scale fingerprint image to obtain a complete fingerprint image, and the specific implementation may refer to the related description of the foregoing embodiments.

In S44, whether it is from a real finger is determined according to the color fingerprint image.

Specifically, the color fingerprint image may be input to a deep learning network to determine whether the color fingerprint image is from a real finger.

If it is from a real finger, S45 is executed; if it is determined that authentication succeeds, an operation of triggering fingerprint authentication is executed, for example, an operation of screen unlocking or payment.

It should be understood that in the embodiment of the present application, after S42, S44 may also be first executed and when it is determined that it is from a real finger, S43 may be then executed; otherwise, it is directly determined that fingerprint authentication fails, and a specific execution process is not specifically limited here.

Figure 10:
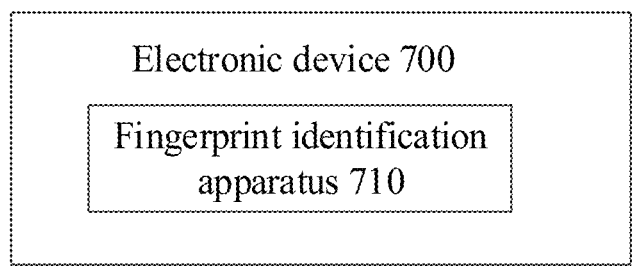
FIG. 10 is a schematic block diagram of an electronic device according to an embodiment of the present application.

As shown in FIG. 10, the embodiment of the present application also provides an electronic device 700, which may include a fingerprint identification apparatus 710, and the fingerprint identification apparatus 710 may be the fingerprint identification apparatus 20 in the foregoing apparatus embodiment, which can be used to execute contents in the method embodiment shown in FIGS. 8 to 9, which will not be repeatedly described here for brevity.

It should be understood that the processor of the embodiment of the present application may be an integrated circuit chip with signal processing capability. In an implementation process, steps of the foregoing method embodiment may be completed by using an integrated logical circuit of hardware in the processor or an instruction in a form of software. The processor may be a general purpose processor, a digital signal processor (DSP), an application-specific integrated circuit (ASIC), a field programmable gate array (FPGA) or another programmable logic device, a discrete gate or transistor logic device, or a discrete hardware component. The methods, the steps, and the logical block diagrams disclosed in the embodiments of the present application can be implemented or executed. The general purpose processor may be a microprocessor or the processor may be any conventional processor or the like. Steps of the method disclosed in the embodiments of the present application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically-erasable programmable memory, or a register. The storage medium is located in the memory, and the processor reads information in the memory and completes the steps of the foregoing method in combination with hardware of the processor. Fingerprint identification in the embodiments of the present application may further include a memory, which may be a volatile memory or a nonvolatile memory, or may include both a volatile memory and a nonvolatile memory.

An embodiment of the present application further provides a computer readable storage medium, where the computer readable storage medium stores one or more programs, and the one or more programs include an instruction. When the instruction is executed by a portable electronic device that includes a plurality of application programs, the portable electronic device can execute the method of the embodiment shown in FIG. 8.

The embodiment of the present application also provides a computer program including instructions that, when executed by a computer, cause the computer to execute the method of the embodiment shown in FIG. 8.

An embodiment of the present application further provides a chip including an input and output interface, at least one processor, at least one memory and a bus, where the at least one memory is configured to store an instruction, the at least one processor is configured to call an instruction in the at least one memory to execute the method of the embodiment shown in FIG. 8.

The relative position relationship (also referred to as structural relationship) of the filter units and the pixel units and the fingerprint identification method are described above. A fingerprint identification apparatus of an embodiment of the present application will be described below in combination with a micro lens array and at least one light shielding layer.

Figure 11:
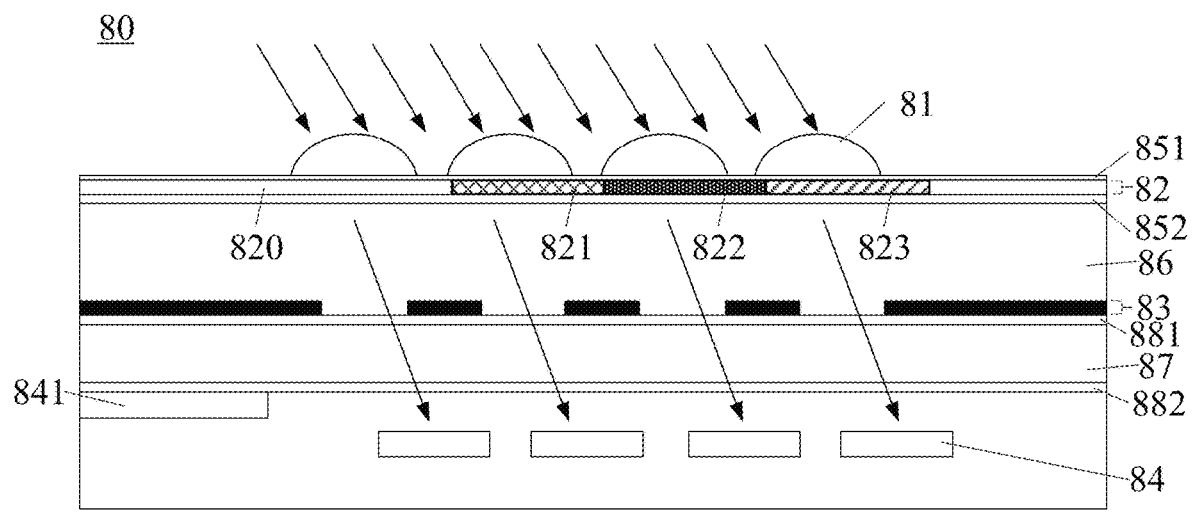
FIG. 11 is another schematic structural diagram of a fingerprint identification apparatus according to an embodiment of the present application.

FIG. 11 is a schematic side sectional diagram of a fingerprint identification apparatus 80 according to an embodiment of the present application.

As shown in FIG. 11, the fingerprint identification apparatus 80 may include a micro lens array, at least one light shielding layer disposed below the micro lens array, and a pixel unit array disposed below the at least one light shielding layer. The micro lens array may include a plurality of micro lenses 81 distributed in an array, the at least one light shielding layer may include a light shielding layer 83, and the pixel unit array may include a plurality of pixel units 84 distributed in an array. The micro lens array is disposed below the display screen; the at least one light shielding layer is disposed below the micro lens array, and each light shielding layer in the at least one light shielding layer is provided with an array of small holes; and a pixel unit array is disposed below an array of small holes of a bottom light shielding layer in the at least one light shielding layer. For example, a small hole in the array of small holes in the bottom light shielding layer is in one-to-one correspondence with a pixel unit in the pixel unit array.

The micro lens array may include a plurality of micro lenses distributed in an array, and each micro lens in the plurality of micro lenses may be a hemispherical lens or a non-hemispherical lens, such as a square lens. In some embodiments, the at least one light shielding layer is a plurality of light shielding layers, and a hole in an array of small holes of a top light shielding layer in the plurality of light shielding layers corresponds to one or more pixel units in the pixel unit array. Optionally, apertures of holes in the plurality of light shielding layers corresponding to the same pixel unit decrease in order from top to bottom. In other embodiments, the at least one light shielding layer is one light shielding layer, and the thickness of the first light shielding layer is greater than a preset threshold to ensure imaging quality. Optionally, a metal wiring layer of the pixel unit array is disposed at a position of a back focal plane of the micro lens array, and the metal wiring layer is provided with a hole formed above each pixel unit in the pixel unit array to form the bottom light shielding layer.

It should be understood that the micro lens array and the at least one light shielding layer may be the light guide structure included in the optical component 132 shown in FIG. 3 or FIG. 4, and the pixel unit array may be the sensing array 133 having a plurality of optical sensing units 131 (which may also be referred to as optical sensing pixels, photosensitive pixels, pixel units, etc.) as shown in FIGS. 1 to 4, which is not repeatedly described here to avoid repetition.

As shown in FIG. 11, in some embodiments of the present application, the fingerprint identification apparatus 80 may further include an array of filter unit groups 82. Each filter unit group in the array of filter unit groups 82 includes at least two filter units, and the at least two filter units are configured to transmit light signals in at least two colors respectively; in other words, the array of filter unit groups 82 may include at least two filter units for transmitting light signals in at least two colors. For example, each filter unit group in the array of filter unit groups 82 may include a first filter unit 821, a second filter unit 822, and a third filter unit 823. The first filter unit 821, the second filter unit 822, and the third filter unit 823 may be configured to transmit a red light signal, a green light signal, and a blue light signal, respectively.

In some embodiments of the present application, the pixel unit array includes a pixel unit group corresponding to the filter unit group, at least two pixel units in the pixel unit group receive a first light signal through the at least two filter units respectively, the first light signal is used to detect whether the finger is a real finger, and a pixel unit except the at least two pixel units in the pixel unit group receives a second light signal through a transparent region 820 between the at least two filter units, or a pixel unit between the pixel unit groups receives the second light signal through a transparent region 820 between the filter unit groups, and the second light signal is used to identify fingerprint information of the finger.

Through a fingerprint image captured by the at least two pixel units, it can be determined whether the finger above the display screen is a real finger, and through a pixel unit except the at least two pixel units, a fingerprint image for fingerprint identification can be acquired. That is, the fingerprint identification apparatus captures a fingerprint image once, which can be used not only for authenticity identification, but also for fingerprint identification, thereby improving the security of fingerprint identification without affecting the fingerprint identification effect. For example, the fingerprint image captured by the at least two pixel units is a fingerprint image in two colors. Since fingerprint images in different colors have significant differences for different materials, authenticity of the fingerprint images can be determined by comparing the fingerprint images in different colors, and thus security of fingerprint identification could be improved.

It should be noted that the array of filter unit groups 82 may be disposed above the micro lens array, or the array of filter unit groups 82 may be disposed between the micro lens array and the pixel unit array.

It should also be noted that a transparent region 820 may be provided between the filter unit groups in the array of filter unit groups 82, and the transparent region 820 may be a transparent medium or an air gap. For example, the transparent region 820 may be a medium with a transmittance of red, green and blue light signals greater than or equal to a preset threshold.

In some embodiments of the present application, please continue to refer to FIG. 11, the fingerprint identification apparatus 80 may further include a transparent medium layer 86. The transparent medium layer 86 is configured to connect the micro lens array, the at least one light shielding layer and the pixel unit array. For example, the transparent medium layer 86 is configured to connect the array of filter unit groups, the at least one light shielding layer and the pixel unit array.

In some embodiments of the present application, please continue to refer to FIG. 11, the fingerprint identification apparatus 80 may further include a first bonding layer 851, and the first bonding layer 851 is configured to bond the micro lens array to the upper surface of the array of filter unit groups 82. Optionally, the fingerprint identification apparatus 80 may further include a second bonding layer 852, and the second bonding layer 852 is configured to dispose the array of filter unit groups 82 above the at least one light shielding layer. For example, the second bonding layer 852 is configured to bond the array of filter unit groups 82 to the upper surface of the transparent medium layer 86. The first bonding layer 851 and the second bonding layer 852 can embed the array of filter unit groups in the fingerprint identification apparatus 80, and the first bonding layer 851 and the second bonding layer 852 can be any form of transparent glue to reduce the loss of a light signal during transmission.

In some embodiments of the present application, please continue to refer to FIG. 11, the fingerprint identification apparatus 80 may further include a first flat layer 881, and the first flat layer 881 is disposed above the pixel unit array, so as to facilitate the setting of the light shielding layer 83.

For example, the fingerprint identification apparatus 80 further includes an infrared filter layer 87, the infrared filter layer 87 is disposed above the micro lens array, or the infrared filter layer 87 is disposed between the micro lens array and the pixel unit array, and the infrared filter layer 87 is configured to filter out an infrared light signal. Optionally, the first flat layer 881 is disposed on the upper surface of the infrared filter layer 87. Optionally, the fingerprint identification apparatus 80 may further include a second flat layer 882, and the second flat layer 882 may be disposed above the pixel unit array to facilitate the setting of the infrared filter layer 87. For example, the second flat layer 882 may be disposed between the first flat layer 881 and the infrared filter layer 87.

In this case, a number of filter units for transmitting a red light signal in the at least two filter units is greater than a number of filter units for transmitting a light signal in another color in the at least two filter units.

The number of filter units for transmitting the red light signal is designed to be greater than the number of filter units for transmitting the light signal in another color, which can ensure that a red fingerprint image for distinguishing between real and fake fingerprints has sufficient brightness even if an infrared filter layer is provided between the array of filter unit groups and the pixel unit array of the fingerprint identification apparatus, thereby improving the identification effect of the red fingerprint image.

In some embodiments of the present application, please continue to refer to FIG. 11, the fingerprint identification apparatus 80 may further include a pad 841 of the pixel unit array 84, which is configured to be connected to a circuit board to implement electrical interconnection inside the fingerprint identification apparatus 80 or electrical interconnection between the fingerprint identification apparatus 80 and an external device (such as other devices of an electronic device where the fingerprint identification apparatus 80 is located).

It should be understood that positional relationships between various components or devices in FIG. 11 are only examples, and appropriate variations that can achieve design requirements of the present application are all within the protection scope of the present application.

It should also be noted that in the above description of the pattern design of the filter unit, array distribution with the filter unit as a particle size and array distribution with the filter unit group as a particle size can be used interchangeably, which is not specifically limited in the embodiment of the present application. For ease of description, description will be made below by taking the array of filter unit groups including a plurality of filter unit groups distributed in an array as an example.

Figure 12:
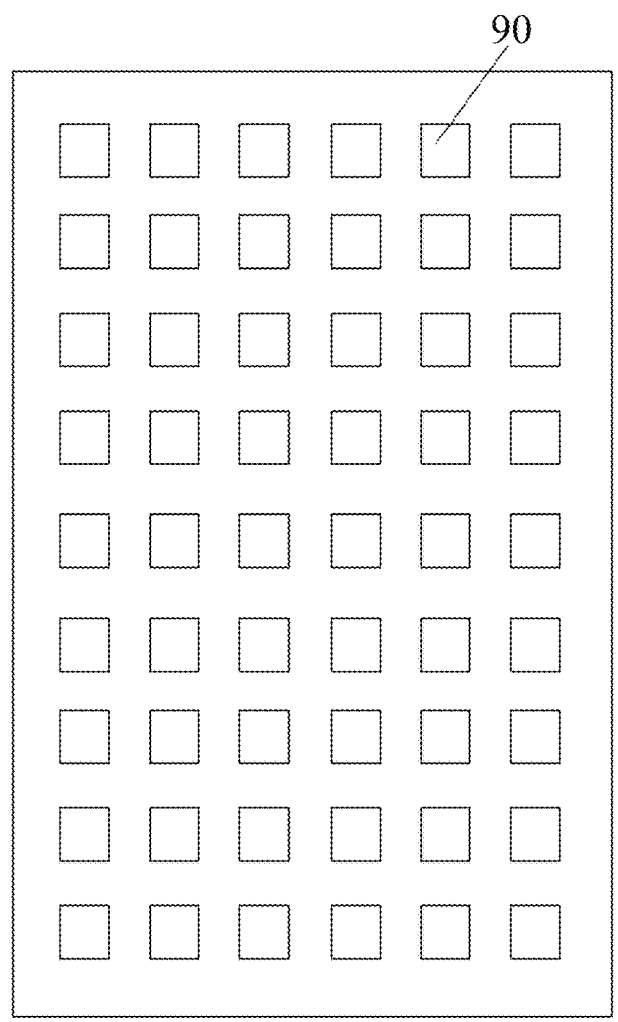
FIG. 12 to FIG. 15 are examples of an array of filter unit groups according to embodiments of the present application.
Figure 13:
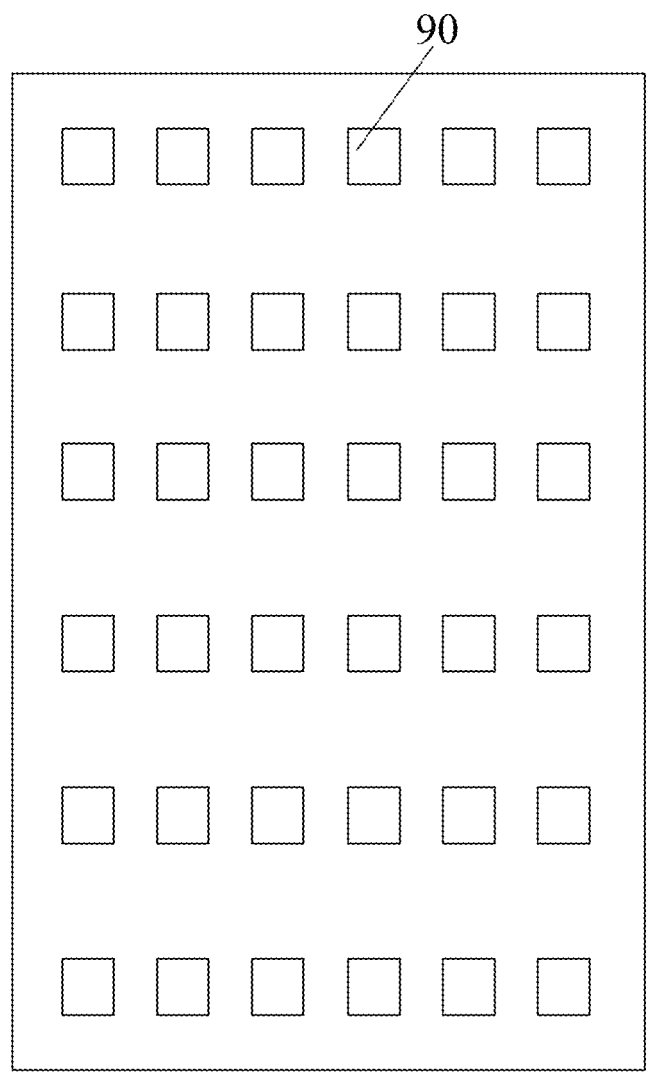
Figure 14:
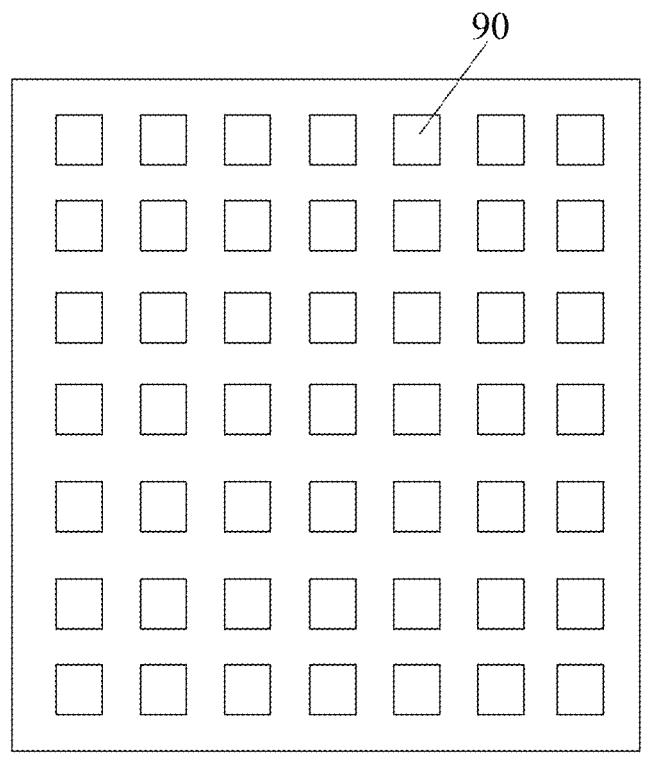
Figure 15:
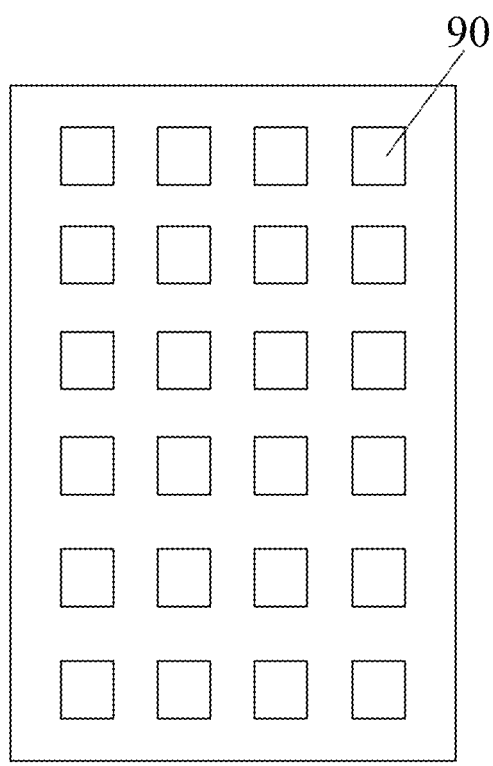

For example, the array of filter unit groups may include a plurality of filter unit groups 90 distributed in an array. As shown in FIG. 12, the array of filter unit groups is a rectangular array of 9×6 filter unit groups. For another example, as shown in FIG. 13, the array of filter unit groups is a rectangular array of 6×6 filter unit groups. For another example, as shown in FIG. 14, the array of filter unit groups is a rectangular array of 7×7 filter unit groups. For another example, as shown in FIG. 15, the array of filter unit groups is a rectangular array of 6×4 filter unit groups. Of course, each filter unit group in the array of filter unit groups may include at least two filter units for transmitting light signals in at least two colors.

It should be noted that the arrays of filter unit groups shown in FIGS. 12 to 15 are only examples, and should not be construed as limitation to the present application.

For example, the array of filter unit groups may be an array of P×L filter unit groups, where the P and L may be determined according to the number of rows and columns of the pixel unit array. For example, P may be 5, 6, 7, . . . , 32, etc., and L may be 5, 6, 7, . . . , 32, etc.

In some embodiments of the present application, each filter unit in the filter unit group corresponds to a plurality of adjacent pixel units in the pixel unit group. For example, the plurality of adjacent pixel units may refer to a plurality of pixel units distributed in a rectangular array, or the plurality of adjacent pixel units may refer to a plurality of consecutive pixel units. Optionally, the first light signal received by the plurality of adjacent pixel units is used to synthesize a pixel value. Using the first light signal received by the plurality of adjacent pixel units to synthesize the pixel value can not only improve the brightness of the fingerprint image in different colors, but also simplify the preparation complexity of the array of filter unit groups.

Figure 16:
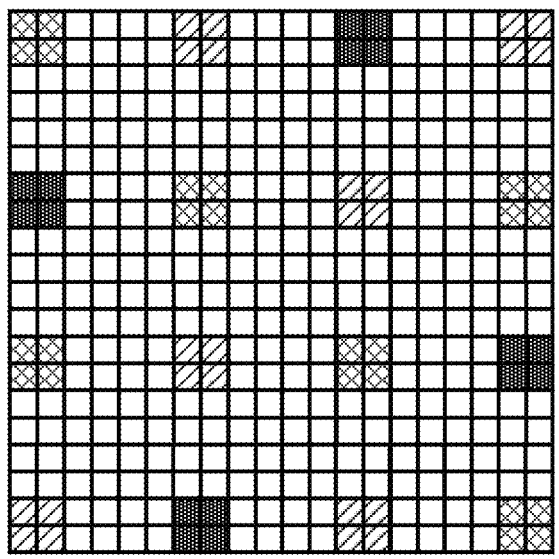
FIG. 16 to FIG. 18 are examples of filter units in an array of filter unit groups according to embodiments of the present application.

For example, as shown in FIG. 16, the pixel unit group is a rectangular array of 20×20 pixel units, and the filter unit group is a rectangular array of 4×4 filter units, each filter unit in the rectangular array of 4×4 filter units corresponds to a rectangular array of 2×2 pixel units in the rectangular array of 20×20 pixel units, and two adjacent filter units in the rectangular array of 4×4 filter units are spaced by 4 pixel units.

In other embodiments of the present application, each filter unit in the filter unit group corresponds to one pixel unit in the pixel unit group. For example, filter units in the array of filter unit groups are distributed in an array. In other words, the array of filter unit groups may not only be distributed in an array with the filter unit group as the particle size, but also be distributed in an array with the filter unit as the particle size.

That each filter unit corresponds to one pixel unit in the pixel unit group can not only improve the resolution of the fingerprint image in different colors, but also ensure that the at least two pixel units are evenly distributed in the pixel unit group.

Figure 17:
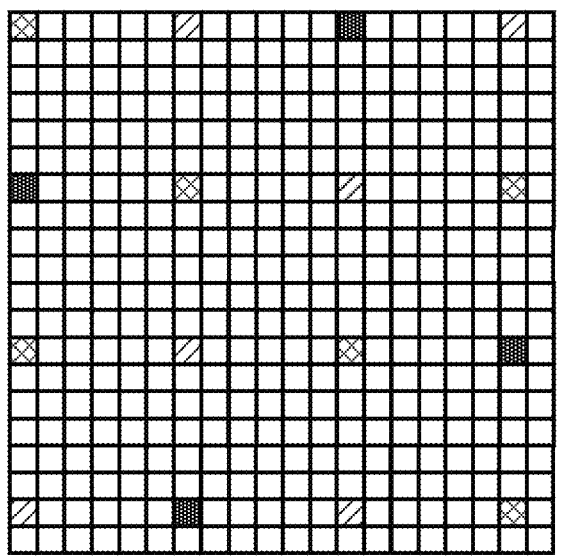

For example, as shown in FIG. 17, the pixel unit group is a rectangular array of 20×20 pixel units, the filter unit group is a rectangular array of 4×4 filter units, and two adjacent filter units in the rectangular array of 4×4 filter units are spaced by 5 pixel units. For example, the rectangular array of 4×4 filter units is aligned by approaching the left and top edges of the rectangular array of 20×20 pixel units.

Of course, in another alternative embodiment, the rectangular array of 4×4 filter units may also be aligned by approaching the right or bottom edge of the rectangular array of 20×20 pixel units.

Figures 18, 19:
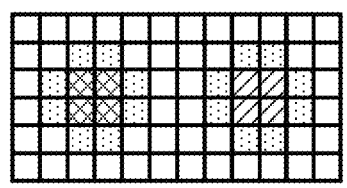
FIG. 19 is a schematic structural diagram of attenuating pixel values of pixel units around a pixel unit group according to an embodiment of the present application.

For another example, as shown in FIG. 18, the pixel unit group is a rectangular array of 2×2 pixel units, and the filter unit group is a rectangular array of 2×2 filter units. In other words, two adjacent filter units in the array of the filter unit groups correspond to two adjacent pixel units in the array of the pixel unit groups.

In some embodiments of the present application, a ratio of pixel units corresponding to the array of filter unit groups to all pixel units in the pixel unit array is greater than or equal to a first preset value, and the ratio of the pixel units corresponding to the array of filter unit groups to all pixel units in the pixel unit array is greater than or equal to a minimum threshold and less than or equal to a second preset value. For example, the first preset value is 1%, and/or the second preset value is 2%.

Through the first preset value, it can be ensured that the fingerprint image for real and fake fingerprint identification has sufficient feature information, and through the second preset value, it can be ensured that the fingerprint image for fingerprint information identification has sufficient feature information. In other words, by setting the first preset value and the second preset value, it is possible to ensure that the accuracy or correctness of real and fake fingerprint judgment is improved on the basis of not affecting the effect of fingerprint identification.

Of course, the specific values of the first preset value and the second preset value are merely examples, and should not be construed as limitation to the present application. For example, the first preset value may also be 2%, and/or the second preset value may also be 5%.

In some embodiments of the present application, a number of pixel units spaced by two adjacent filter unit groups in the array of filter unit groups is greater than or equal to a third preset value, and the number of pixel units spaced by two adjacent filter unit groups in the array of filter unit groups is less than or equal to a fourth preset value. For example, the third preset value is 2, and/or the fourth preset value is 6.

At least two pixel units in the pixel unit group are configured for real and fake fingerprint identification. In the fingerprint identification process, the pixel values of the positions of the at least two pixel units can be recovered by interpolation. By considering the influence of the filter unit group, pixel values of the pixel units between the pixel unit groups (for example, as shown in FIG. 19, the pixel units adjacent to the pixel unit group in the upper, lower, left, and right sides) may be attenuated to some extent. Through the third preset value, it can be ensured that the pixel units between the pixel unit groups not only have attenuated pixel units, but also have non-attenuated pixel units (by means of interpolation, it may be used to recover a pixel value of a pixel unit corresponding to a filter unit in a filter unit group). Through the fourth preset value, correlation between the two adjacent pixel unit groups can be ensured so as to determine whether the finger located above the display screen is a real finger based on the pixel values in at least two colors for the same position of the finger.

Of course, the specific values of the third preset value and the fourth preset value are merely examples, and should not be construed as limitation to the present application. For example, the third preset value may also be 4, and the fourth preset value may also be 8.

Preferred embodiments of the present application have been described above in detail with reference to the accompanying drawings. However, the present application is not limited to specific details of the above embodiments. Various simple variations may be made to the technical solution of the present application within the scope of the technical concept of the present application, and these simple variations all fall within the scope of protection of the present application.

For example, various specific technical features described in the foregoing specific embodiments may be combined in any suitable manner without contradiction. In order to avoid unnecessary repetition, various possible combination manners will not be separately described in the present application.

For another example, any combination of various different embodiments of the present application may also be made as long as it does not contradict the idea of the present application, and should also be regarded as the disclosure of the present application.

It should be understood that sequence numbers of the foregoing processes do not mean execution sequences in various method embodiments of the present application. The execution sequences of the processes should be determined according to functions and internal logic of the processes, and should not be construed as any limitation to the implementation processes of the embodiments of the present application.

An embodiment of the present application further provides an electronic device, and the electronic device may include a display screen and a fingerprint detection apparatus in the above embodiment of the present application, where the fingerprint detection apparatus is disposed under the display screen to implement under-screen optical fingerprint detection.

The electronic device may be any electronic device having a display screen. For example, the electronic device may be the electronic device as shown in FIGS. 1 to 4.

The display screen may use the display screen in the above description, such as an OLED display screen or other display screens. For the related description of the display screen, reference may be made to illustration of the display screen in the above description, and no further details are provided herein for brevity.

It should be understood that specific examples in embodiments of the present application are just for helping those skilled in the art better understand the embodiments of the present application, rather than for limiting the scope of the present application.

It should be understood that terms used in embodiments of the present application and the claims appended hereto are merely for the purpose of describing particular embodiments, and are not intended to limit the embodiments of the present application. For example, the use of a singular form of "a", "the" and "said" in the embodiment of the present application and the claims appended hereto are also intended to include a plural form, unless otherwise clearly indicated herein by context.

Those of ordinary skill in the art may be aware that units in various examples described with reference to the embodiments disclosed in this text can be implemented by electronic hardware, computer software, or a combination of the two. To clearly describe interchangeability between the hardware and the software, the foregoing has generally described compositions and steps of the various examples according to functions. Whether these functions are performed by hardware or software depends on particular applications and designed constraint conditions of the technical solutions. Persons skilled in the art may use different methods to implement the described functions for each particular application, but it should not be considered that the implementation goes beyond the scope of the present application.

In the several embodiments provided in the present application, it should be understood that the disclosed system and apparatus may be implemented in other manners. For example, the described apparatus embodiments are merely illustrative. For example, the unit division is merely logical function division and may be other division in actual implementation. For example, a plurality of units or components may be combined or integrated into another system, or some features may be ignored or not performed. In addition, the displayed or discussed mutual coupling or direct coupling or communication connection may be indirect coupling or communication connection through some interfaces, apparatuses or units, and may also be connection in electrical, mechanical, or other forms.

The units described as separate components may or may not be physically separate, and components displayed as units may or may not be physical units, may be located in one position, or may be distributed on multiple network units. Part of or all of the units here may be selected according to actual needs to achieve the objects of the solutions of the embodiments of the present application.

In addition, various functional units in the embodiments of the present application may be integrated into a processing unit, or each unit may exist alone physically, or two or more than two units may be integrated into one unit. The integrated unit may be implemented in a form of hardware, or may be implemented in a form of a software function unit.

If the integrated unit is implemented in the form of the software function unit and is sold or used as an independent product, it may be stored in a computer readable storage medium. Based on such understanding, the nature of the technical solutions of the present application, or the part contributing to the prior art, or all of or part of the technical solutions may be implemented in a form of software product. The computer software product is stored in a storage medium and includes several instructions for instructing a computer device (which may be a personal computer, a server, or a network device, and the like) to execute all of or part of the steps of the method described in the embodiments of the present application. The foregoing storage medium includes: various media that may store program codes, such as a U-disk, a removable hard disk, a read-only memory (ROM), a random access memory (RAM), a magnetic disk, a compact disk, and so on.

The foregoing descriptions are merely specific implementations of the present application. The protection scope of the present application, however, is not limited thereto. Various equivalent modifications or replacements may be readily conceivable to any person skilled in the art within the technical scope disclosed in the present application, and such modifications or replacements shall fall within the protection scope of the present application. Therefore, the protection scope of the present application shall be subject to the protection scope of the claims.

What is claimed is:

1. A fingerprint identification apparatus, wherein the fingerprint identification apparatus is applied under a display screen to implement under-screen optical fingerprint identification, and the fingerprint identification apparatus comprises:
   a micro lens array disposed below the display screen;
   at least one light shielding layer disposed below the micro lens array, wherein each light shielding layer in the at least one light shielding layer is provided with an array of small holes;
   a pixel unit array disposed below an array of small holes of a bottom light shielding layer in the at least one light shielding layer, so that a light signal returned from a finger above the display screen is transmitted to the pixel unit array through the array of small holes provided in the at least one light shielding layer after being converged by the micro lens array; and
   an array of filter unit groups, wherein each filter unit group in the array of filter unit groups comprises at least two filter units, and the at least two filter units are configured to transmit light signals in at least two colors respectively,
   wherein the pixel unit array comprises a pixel unit group corresponding to the filter unit group, at least two pixel units in the pixel unit group receive a first light signal through the at least two filter units respectively, the first light signal is used to detect whether the finger is a real finger, and a pixel unit except the at least two pixel units in the pixel unit group receives a second light signal through a transparent region between the at least two filter units, or a pixel unit between pixel unit groups receives the second light signal through a transparent region between the filter unit groups, and the second light signal is used to identify fingerprint information of the finger; and a ratio of pixel units corresponding to the array of filter unit groups to all pixel units in the pixel unit array is greater than or equal to a first preset value, and the ratio of pixel units corresponding to the array of filter unit groups to all pixel units in the pixel unit array is less than or equal to a second preset value.

2. The fingerprint identification apparatus according to claim 1, wherein each filter unit in the filter unit group corresponds to a plurality of adjacent pixel units in the pixel unit group.

3. The fingerprint identification apparatus according to claim 2, wherein the pixel unit group is a rectangular array of 20×20 pixel units, and the filter unit group is a rectangular array of 4×4 filter units, each filter unit in the rectangular array of 4×4 filter units corresponds to a rectangular array of 2×2 pixel units in the rectangular array of 20×20 pixel units, and two adjacent filter units in the rectangular array of 4×4 filter units are spaced by 4 pixel units.

4. The fingerprint identification apparatus according to claim 2, wherein the first light signal received by the plurality of adjacent pixel units is used to synthesize a pixel value.

5. The fingerprint identification apparatus according to claim 1, wherein each filter unit in the filter unit group corresponds to one pixel unit in the pixel unit group.

6. The fingerprint identification apparatus according to claim 5, wherein the pixel unit group is a rectangular array of 20×20 pixel units, the filter unit group is a rectangular array of 4×4 filter units, and two adjacent filter units in the rectangular array of 4×4 filter units are spaced by 5 pixel units.

7. The fingerprint identification apparatus according to claim 5, wherein the pixel unit group is a rectangular array of 2×2 pixel units, and the filter unit group is a rectangular array of 2×2 filter units.

8. The fingerprint identification apparatus according to claim 1, wherein the first preset value is 1%, and/or the second preset value is 2%.

9. The fingerprint identification apparatus according to claim 1, wherein a number of pixel units spaced by two adjacent filter unit groups in the array of filter unit groups is greater than or equal to a third preset value, and the number of pixel units spaced by two adjacent filter unit groups in the array of filter unit groups is less than or equal to a fourth preset value.

10. The fingerprint identification apparatus according to claim 9, wherein the third preset value is 2, and/or the fourth preset value is 6.

11. The fingerprint identification apparatus according to claim 1, wherein the array of filter unit groups is a rectangular array of 9×6 filter unit groups, or the array of filter unit groups is a rectangular array of 6×6 filter unit groups, or the array of filter unit groups is a rectangular array of 7×7 filter unit groups, or the array of filter unit groups is a rectangular array of 6×4 filter unit groups.

12. The fingerprint identification apparatus according to claim 1, wherein the array of filter unit groups is disposed above the micro lens array, or the array of filter unit groups is disposed between the micro lens array and the pixel unit array.

13. The fingerprint identification apparatus according to claim 1, wherein the fingerprint identification apparatus further comprises:

an infrared filter layer, wherein the infrared filter layer is disposed above the micro lens array, or the infrared filter layer is disposed between the micro lens array and the pixel unit array, and the infrared filter layer is configured to filter out an infrared light signal.

14. The fingerprint identification apparatus according to claim 13, wherein a number of filter units for transmitting a red light signal in the at least two filter units is greater than a number of filter units for transmitting a light signal in another color in the at least two filter units.

15. The fingerprint identification apparatus according to claim 1, wherein the at least one light shielding layer is a plurality of light shielding layers, and a hole in an array of small holes of a top light shielding layer in the plurality of light shielding layers corresponds to one or more pixel units in the pixel unit array.

16. The fingerprint identification apparatus according to claim 15, wherein apertures of holes in the plurality of light shielding layers corresponding to the same pixel unit decrease in order from top to bottom.

17. The fingerprint identification apparatus according to claim 1, wherein a metal wiring layer of the pixel unit array is disposed at a position of a back focal plane of the micro lens array, and the metal wiring layer is provided with a hole formed above each pixel unit in the pixel unit array to form the bottom light shielding layer.

18. The fingerprint identification apparatus according to claim 1, wherein the fingerprint identification apparatus further comprises:

a transparent medium layer, wherein the transparent medium layer is configured to connect the micro lens array, the at least one light shielding layer and the pixel unit array.

19. The fingerprint identification apparatus according to claim 1, wherein the second preset value is 5%.

20. An electronic device, comprising:

a display screen; and a fingerprint identification apparatus which is disposed under the display screen to implement under-screen optical fingerprint detection, wherein the fingerprint identification apparatus comprises:

a micro lens array disposed below the display screen;

at least one light shielding layer disposed below the micro lens array, wherein each light shielding layer in the at least one light shielding layer is provided with an array of small holes;

a pixel unit array disposed below an array of small holes of a bottom light shielding layer in the at least one light shielding layer, so that a light signal returned from a finger above the display screen is transmitted to the pixel unit array through the array of small holes provided in the at least one light shielding layer after being converged by the micro lens array; and an array of filter unit groups, wherein each filter unit group in the array of filter unit groups comprises at least two filter units, and the at least two filter units are configured to transmit light signals in at least two colors respectively, wherein the pixel unit array comprises a pixel unit group corresponding to the filter unit group, at least two pixel units in the pixel unit group receive a first light signal through the at least two filter units respectively, the first light signal is used to detect whether the finger is a real finger, and a pixel unit except the at least two pixel units in the pixel unit group receives a second light signal through a transparent region between the at least two filter units, or a pixel unit between pixel unit groups receives the second light signal through a transparent region between the filter unit groups, and the second light signal is used to identify fingerprint information of the finger; and a ratio of pixel units corresponding to the array of filter unit groups to all pixel units in the pixel unit array is greater than or equal to a first preset value, and the ratio of pixel units corresponding to the array of filter unit groups to all pixel units in the pixel unit array is less than or equal to a second preset value.

* * * * *